(12) United States Patent
Bakalash et al.

(10) Patent No.: US 8,754,897 B2
(45) Date of Patent: *Jun. 17, 2014

(54) SILICON CHIP OF A MONOLITHIC CONSTRUCTION FOR USE IN IMPLEMENTING MULTIPLE GRAPHIC CORES IN A GRAPHICS PROCESSING AND DISPLAY SUBSYSTEM

(75) Inventors: Reuven Bakalash, Shdema (IL); Offir Remez, Hod HaSharon (IL); Efi Fogel, Tel Aviv (IL)

(73) Assignee: Lucidlogix Software Solutions, Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/946,032

(22) Filed: Nov. 15, 2010

(65) Prior Publication Data

US 2011/0169841 A1 Jul. 14, 2011

Related U.S. Application Data

(63) Continuation of application No. 11/386,454, filed on Mar. 22, 2006, now Pat. No. 7,834,880, which is a continuation-in-part of application No. 11/340,402, filed on Jan. 25, 2006, now Pat. No. 7,812,844.

(60) Provisional application No. 60/647,146, filed on Jan. 25, 2005.

(30) Foreign Application Priority Data

| Jan. 28, 2004 | (WO) | PCT/IL2004/000079 |
| Aug. 19, 2004 | (WO) | WO 2004/070652 A2 |
| Nov. 19, 2004 | (WO) | PCT/IL2004/001069 |
| Jun. 2, 2005 | (WO) | WO 2005/050557 |

(51) Int. Cl.
*G06F 15/80* (2006.01)
*G06F 13/14* (2006.01)

(52) U.S. Cl.
USPC .................................... 345/519; 345/505

(58) Field of Classification Search
USPC .................. 345/505, 519, 506, 419, 520
See application file for complete search history.

(56) References Cited

U.S. PATENT DOCUMENTS

| 5,392,391 A | 2/1995 | Caulk et al. |
| 5,475,856 A | 12/1995 | Kogge ................... G06F 13/00 |

(Continued)

FOREIGN PATENT DOCUMENTS

| JP | 2-176980 | 7/1990 | ............. G06F 15/66 |
| WO | WO 2004/070652 A2 | 8/2004 | |

OTHER PUBLICATIONS

EP 04 79 9376, Oct. 14, 2008.

(Continued)

*Primary Examiner* — Hau Nguyen
(74) *Attorney, Agent, or Firm* — Eitan, Mehulal & Sadot

(57) ABSTRACT

A silicon chip of a monolithic construction for use in implementing a multiple core graphics processing and display subsystem in a computing system having a CPU, a system memory, an operating system (OS), a CPU bus, and a display device with a display surface. The computing system supports (i) one or more software applications for issuing graphics commands, (ii) one or more graphics libraries for storing data used to implement said graphics commands. The silicon chip comprises multiple graphic pipeline cores, a partial frame buffer for buffering pixels corresponding to image fragments, a routing center, control unit, and a display interface, for displaying composited images on the display surface of the computing system.

12 Claims, 26 Drawing Sheets

(56) References Cited

U.S. PATENT DOCUMENTS

| | | | |
|---|---|---|---|
| 5,495,419 A | 2/1996 | Rostoker et al. | G06F 17/00 |
| 5,535,410 A | 7/1996 | Watanabe et al. | G06F 13/00 |
| 5,687,357 A | 11/1997 | Priem | G11C 7/00 |
| 5,696,892 A | 12/1997 | Redmann et al. | G06T 15/70 |
| 5,740,464 A | 4/1998 | Priem et al. | G06F 12/06 |
| 5,745,762 A | 4/1998 | Celi, Jr. et al. | G06F 9/44 |
| 5,754,866 A | 5/1998 | Priem | G06F 9/46 |
| 5,757,385 A | 5/1998 | Narayanaswami et al. | G06F 15/80 |
| 5,758,182 A | 5/1998 | Rosenthal et al. | G06F 13/00 |
| 5,794,016 A | 8/1998 | Kelleher | G06F 15/80 |
| 5,841,444 A | 11/1998 | Mun et al. | G06T 1/20 |
| 5,909,595 A | 6/1999 | Rosenthal et al. | G06F 13/14 |
| 5,933,157 A | 8/1999 | Van Hook et al. | |
| 5,938,756 A | 8/1999 | Van Hook et al. | |
| 5,977,997 A | 11/1999 | Vainsencher | |
| 6,118,462 A | 9/2000 | Mergulis | G06F 13/16 |
| 6,169,553 B1 | 1/2001 | Fuller et al. | G06F 15/20 |
| 6,181,352 B1 | 1/2001 | Kirk et al. | G06T 1/20 |
| 6,184,908 B1 | 2/2001 | Chan et al. | G06F 15/00 |
| 6,188,412 B1 | 2/2001 | Morein | G06F 13/00 |
| 6,191,800 B1 | 2/2001 | Arenburg et al. | G06F 15/80 |
| 6,201,545 B1 | 3/2001 | Wong et al. | G06T 17/00 |
| 6,212,261 B1 | 4/2001 | Meubus et al. | H04M 1/64 |
| 6,212,617 B1 | 4/2001 | Hardwick | G06F 9/54 |
| 6,240,516 B1 | 5/2001 | Vainsencher | |
| 6,259,460 B1 | 7/2001 | Gossett et al. | G06F 1/20 |
| 6,288,418 B1 | 9/2001 | Reed et al. | H01L 27/10 |
| 6,292,200 B1 | 9/2001 | Bowen et al. | G06T 1/20 |
| 6,333,744 B1 | 12/2001 | Kirk et al. | G06T 1/20 |
| 6,337,686 B2 | 1/2002 | Wong et al. | G06F 11/20 |
| 6,352,479 B1 | 3/2002 | Sparks, II | A63F 13/12 |
| 6,362,825 B1 | 3/2002 | Johnson | G06T 15/00 |
| 6,415,345 B1 | 7/2002 | Wu et al. | G06F 13/00 |
| 6,442,656 B1 | 8/2002 | Alasti et al. | G06F 12/00 |
| 6,462,737 B2 | 10/2002 | Lindholm et al. | G06T 17/00 |
| 6,473,086 B1 | 10/2002 | Morein et al. | G06F 15/80 |
| 6,473,089 B1 | 10/2002 | Wei et al. | G06T 11/40 |
| 6,477,687 B1 | 11/2002 | Thomas | G06F 17/50 |
| 6,492,987 B1 | 12/2002 | Morein | G06T 15/40 |
| 6,496,187 B1 | 12/2002 | Deering et al. | G06T 15/00 |
| 6,496,404 B1 | 12/2002 | Fiedler et al. | H01L 23/48 |
| 6,502,173 B1 | 12/2002 | Aleksic et al. | G06F 12/00 |
| 6,529,198 B1 | 3/2003 | Miyauchi | G06F 15/80 |
| 6,532,013 B1 | 3/2003 | Papakipos et al. | G06T 17/00 |
| 6,532,525 B1 | 3/2003 | Aleksic et al. | G06F 12/00 |
| 6,535,209 B1 | 3/2003 | Abdalla et al. | G06T 17/00 |
| 6,542,971 B1 | 4/2003 | Reed | G06F 13/00 |
| 6,557,065 B1 | 4/2003 | Peleg et al. | G06F 13/00 |
| 6,577,309 B2 | 6/2003 | Lindholm et al. | G06T 17/00 |
| 6,577,320 B1 | 6/2003 | Kirk | G09G 5/00 |
| 6,578,068 B1 | 6/2003 | Bowman-Amuah | G06F 15/16 |
| 6,593,923 B1 | 7/2003 | Donovan et al. | G06T 15/00 |
| 6,600,492 B1 | 7/2003 | Shimomura et al. | |
| 6,633,296 B1 | 10/2003 | Laksono et al. | G06F 15/16 |
| 6,636,212 B1 | 10/2003 | Zhu | G06T 15/00 |
| 6,636,215 B1 | 10/2003 | Greene | G06T 15/00 |
| 6,646,639 B1 | 11/2003 | Greene et al. | G06T 15/00 |
| 6,650,330 B2 | 11/2003 | Lindholm et al. | G06T 1/20 |
| 6,650,331 B2 | 11/2003 | Lindholm et al. | G06T 17/00 |
| 6,657,635 B1 | 12/2003 | Hutchins et al. | G06F 12/02 |
| 6,662,257 B1 | 12/2003 | Caruk et al. | G06F 13/14 |
| 6,664,960 B2 | 12/2003 | Goel et al. | G06T 15/00 |
| 6,664,963 B1 | 12/2003 | Zatz | G06T 15/60 |
| 6,670,958 B1 | 12/2003 | Aleksic et al. | G06F 15/13 |
| 6,677,953 B1 | 1/2004 | Twardowski et al. | G06F 15/00 |
| 6,683,614 B2 | 1/2004 | Walls et al. | G06T 1/20 |
| 6,690,372 B2 | 2/2004 | Donovan et al. | G06T 15/00 |
| 6,691,180 B2 | 2/2004 | Priem et al. | G06F 13/00 |
| 6,700,583 B2 | 3/2004 | Fowler et al. | G09G 5/39 |
| 6,704,025 B1 | 3/2004 | Bastos et al. | G09G 5/02 |
| 6,724,394 B1 | 4/2004 | Zatz et al. | G06T 15/40 |
| 6,725,457 B1 | 4/2004 | Priem et al. | G06F 9/00 |
| 6,728,820 B1 | 4/2004 | Brian et al. | G06F 13/36 |
| 6,731,298 B1 | 5/2004 | Moreton et al. | G06T 11/40 |
| 6,731,407 B1 | 5/2004 | Hayama | H04N 1/40 |
| 6,734,861 B1 | 5/2004 | Van Dyke et al. | G06T 17/00 |
| 6,734,874 B2 | 5/2004 | Lindholm et al. | G09G 5/00 |
| 6,741,243 B2 | 5/2004 | Lewis et al. | G06T 15/00 |
| 6,744,433 B1 | 6/2004 | Bastos et al. | G06T 15/40 |
| 6,753,878 B1 | 6/2004 | Heirich et al. | G06F 15/16 |
| 6,774,895 B1 | 8/2004 | Papakipos et al. | G06T 15/40 |
| 6,778,176 B2 | 8/2004 | Lindholm et al. | G06F 13/00 |
| 6,778,177 B1 | 8/2004 | Furtner | G06F 12/02 |
| 6,778,181 B1 | 8/2004 | Kilgariff et al. | G09G 5/00 |
| 6,778,189 B1 | 8/2004 | Kilgard | G09G 5/00 |
| 6,779,069 B1 | 8/2004 | Treichler et al. | G06F 13/00 |
| 6,789,154 B1 | 9/2004 | Lee et al. | G06F 13/14 |
| 6,797,998 B2 | 9/2004 | Dewey et al. | H01L 23/48 |
| 6,801,202 B2 | 10/2004 | Nelson et al. | G06F 15/16 |
| 6,812,927 B1 | 11/2004 | Cutler et al. | G06T 1/20 |
| 6,825,843 B2 | 11/2004 | Allen et al. | G06T 15/00 |
| 6,828,980 B1 | 12/2004 | Moreton et al. | G09G 5/00 |
| 6,828,987 B2 | 12/2004 | Swan | G09G 5/00 |
| 6,831,652 B1 | 12/2004 | Orr | G06F 12/02 |
| 6,842,180 B1 | 1/2005 | Maiyuran et al. | |
| 6,844,879 B2 | 1/2005 | Miyaushi | G06F 15/16 |
| 6,856,320 B1 | 2/2005 | Rubinstein et al. | G06F 12/02 |
| 6,864,893 B2 | 3/2005 | Zatz | G06F 15/16 |
| 6,864,984 B2 | 3/2005 | Naya et al. | G01N 21/55 |
| 6,870,540 B1 | 3/2005 | Lindholm et al. | G06T 1/00 |
| 6,873,324 B2 | 3/2005 | Saito et al. | G06T 15/00 |
| 6,876,362 B1 | 4/2005 | Newhall, Jr. et al. | G06T 15/00 |
| 6,885,376 B2 | 4/2005 | Tang-Petersen et al. | G06T 1/20 |
| 6,894,687 B1 | 5/2005 | Kilgard et al. | G06T 15/00 |
| 6,894,689 B1 | 5/2005 | Greene et al. | G06T 15/00 |
| 6,900,810 B1 | 5/2005 | Moreton et al. | G06T 1/00 |
| 6,919,896 B2 | 7/2005 | Sasaki et al. | G06F 15/80 |
| 6,938,176 B1 | 8/2005 | Alben et al. | G06F 1/26 |
| 6,940,515 B1 | 9/2005 | Moreton et al. | G06T 1/00 |
| 6,947,047 B1 | 9/2005 | Moy et al. | G06T 15/00 |
| 6,947,865 B1 | 9/2005 | Mimberg et al. | G01K 1/00 |
| 6,952,206 B1 | 10/2005 | Craighead | G06T 15/40 |
| 6,956,579 B1 | 10/2005 | Diard et al. | G06F 13/00 |
| 6,959,110 B1 | 10/2005 | Danskin et al. | G06K 9/00 |
| 6,961,057 B1 | 11/2005 | Van Dyke et al. | G06T 15/40 |
| 6,975,319 B1 | 12/2005 | Donovan et al. | G06T 17/00 |
| 6,980,209 B1 | 12/2005 | Donham et al. | G06T 15/50 |
| 6,982,718 B2 | 1/2006 | Kilgard et al. | G06T 1/20 |
| 6,985,152 B2 | 1/2006 | Rubinstein et al. | G06F 13/14 |
| 6,989,840 B1 | 1/2006 | Everitt et al. | G09G 5/02 |
| 6,992,667 B2 | 1/2006 | Lindholm et al. | G06T 17/00 |
| 6,995,767 B1 | 2/2006 | Donovan et al. | G09G 5/00 |
| 6,999,076 B2 | 2/2006 | Morein | G06T 15/40 |
| 7,002,588 B1 | 2/2006 | Lindholm et al. | G09G 5/37 |
| 7,015,915 B1 | 3/2006 | Diard | G06T 1/00 |
| 7,023,437 B1 | 4/2006 | Voorhies et al. | G06T 15/00 |
| 7,027,972 B1 | 4/2006 | Lee | G06F 3/00 |
| 7,038,678 B2 | 5/2006 | Bunnell | G06T 15/00 |
| 7,038,685 B1 | 5/2006 | Lindholm | G06F 15/00 |
| 7,038,692 B1 | 5/2006 | Priem et al. | G09G 5/36 |
| 7,051,139 B2 | 5/2006 | Peleg et al. | G06F 13/00 |
| 7,053,901 B2 | 5/2006 | Huang et al. | G06T 1/00 |
| 7,064,763 B2 | 6/2006 | Lindholm et al. | G06T 17/00 |
| 7,068,272 B1 | 6/2006 | Voorhies et al. | G06T 17/00 |
| 7,068,278 B1 | 6/2006 | Williams et al. | G06T 1/20 |
| 7,075,541 B2 | 7/2006 | Diard | G06F 15/80 |
| 7,080,194 B1 | 7/2006 | Van Dyke | G06F 12/12 |
| 7,081,895 B2 | 7/2006 | Papakipos et al. | G06T 1/20 |
| 7,091,971 B2 | 8/2006 | Morein | G06T 15/40 |
| 7,095,414 B2 | 8/2006 | Lindholm et al. | G06F 13/14 |
| 7,098,922 B1 | 8/2006 | Bastos et al. | G06T 1/20 |
| 7,119,808 B2 | 10/2006 | Goncalez et al. | G06F 15/16 |
| 7,120,816 B2 | 10/2006 | Williams et al. | G06F 1/12 |
| 7,123,266 B2 | 10/2006 | Wei et al. | G06T 15/00 |
| 7,129,909 B1 | 10/2006 | Dong et al. | G09G 5/00 |
| 7,130,316 B2 | 10/2006 | Kovacevic | H04J 3/06 |
| 7,142,215 B1 | 11/2006 | Papakipos et al. | G06T 1/20 |
| 7,145,565 B2 | 12/2006 | Everitt et al. | G06T 15/50 |
| 7,170,513 B1 | 1/2007 | Voorhies et al. | G06T 15/00 |
| 7,170,515 B1 | 1/2007 | Zhu | G06T 15/00 |
| 7,224,359 B1 | 5/2007 | Papakipos et al. | G06T 15/40 |
| 7,248,261 B1 | 7/2007 | Hakura | G06T 15/60 |
| 7,289,125 B2 | 10/2007 | Diard et al. | G06F 15/00 |

(56) References Cited

U.S. PATENT DOCUMENTS

| | | | |
|---|---|---|---|
| 7,324,111 B2 | 1/2008 | Diamond | G06F 13/14 |
| 7,324,547 B1 | 1/2008 | Alfieri et al. | H04L 12/66 |
| 7,325,086 B2 | 1/2008 | Kong et al. | G06F 13/40 |
| 7,372,465 B1 | 5/2008 | Tamasi et al. | G06F 15/16 |
| 7,379,067 B2* | 5/2008 | Deering et al. | 345/506 |
| 7,388,581 B1 | 6/2008 | Diard et al. | G06T 15/40 |
| 7,477,256 B1 | 1/2009 | Johnson | G06F 15/16 |
| 7,525,547 B1 | 4/2009 | Diard | G06F 15/16 |
| 7,598,958 B1 | 10/2009 | Kelleher | G06F 15/16 |
| 7,633,505 B1 | 12/2009 | Kelleher | G06F 15/16 |
| 7,782,325 B2 | 8/2010 | Gonzalez et al. | G06F 15/80 |
| 7,868,892 B2 | 1/2011 | Hara et al. | G06F 13/14 |
| 2001/0029556 A1 | 10/2001 | Priem et al. | G06F 13/28 |
| 2002/0015055 A1 | 2/2002 | Foran | G09G 5/00 |
| 2002/0059302 A1 | 5/2002 | Ebihara | G06F 7/00 |
| 2002/0085007 A1 | 7/2002 | Nelson et al. | G06F 15/80 |
| 2002/0118308 A1 | 8/2002 | Dujmenovic | H04N 5/50 |
| 2002/0145612 A1 | 10/2002 | Blythe et al. | G09G 5/00 |
| 2002/0180740 A1 | 12/2002 | Lindholm et al. | G06T 1/20 |
| 2002/0196251 A1 | 12/2002 | Duluk, Jr. et al. | G06T 17/00 |
| 2002/0196259 A1 | 12/2002 | Lindholm et al. | G06T 1/20 |
| 2003/0020720 A1 | 1/2003 | Lindholm et al. | G06T 1/20 |
| 2003/0034975 A1 | 2/2003 | Lindholm et al. | G06T 15/50 |
| 2003/0038808 A1 | 2/2003 | Lindholm et al. | G06T 1/20 |
| 2003/0080959 A1 | 5/2003 | Morein | G06T 15/40 |
| 2003/0103054 A1 | 6/2003 | Montrym et al. | G06T 1/20 |
| 2003/0112245 A1 | 6/2003 | Lindholm et al. | G06T 1/20 |
| 2003/0112246 A1 | 6/2003 | Lindholm et al. | G06F 13/14 |
| 2003/0117971 A1 | 6/2003 | Aubury | H04B 7/212 |
| 2003/0128197 A1 | 7/2003 | Turner et al. | G09G 5/00 |
| 2003/0128216 A1* | 7/2003 | Walls et al. | 345/506 |
| 2003/0136843 A1 | 7/2003 | Ralph et al. | H04N 3/02 |
| 2003/0151606 A1 | 8/2003 | Morein | G06T 15/40 |
| 2003/0164832 A1 | 9/2003 | Alcorn | G06F 15/80 |
| 2003/0164834 A1 | 9/2003 | Lefebvre et al. | G06F 15/80 |
| 2003/0171907 A1 | 9/2003 | Gal-On et al. | G06F 17/50 |
| 2003/0179220 A1 | 9/2003 | Dietrich, Jr. et al. | G09G 5/00 |
| 2003/0188075 A1 | 10/2003 | Peleh et al. | G06F 13/36 |
| 2003/0189565 A1 | 10/2003 | Lindholm et al. | G06T 1/00 |
| 2003/0212735 A1 | 11/2003 | Hicok et al. | G06F 15/16 |
| 2004/0012600 A1* | 1/2004 | Deering et al. | 345/506 |
| 2004/0036159 A1 | 2/2004 | Bruno | H01L 23/006 |
| 2004/0066384 A1 | 4/2004 | Ohba | G06T 15/00 |
| 2004/0153778 A1 | 8/2004 | Cheng | H04L 1/22 |
| 2004/0169651 A1 | 9/2004 | Everitt et al. | G06T 15/60 |
| 2004/0179019 A1 | 9/2004 | Sabella et al. | G06F 13/00 |
| 2004/0196289 A1 | 10/2004 | Langendorf et al. | G09G 5/39 |
| 2004/0207618 A1 | 10/2004 | William et al. | G09G 5/00 |
| 2004/0210788 A1 | 10/2004 | Williams et al. | G06F 1/12 |
| 2004/0223003 A1 | 11/2004 | Heirich et al. | B41J 1/00 |
| 2004/0250231 A1 | 12/2004 | Killian et al. | G06F 17/50 |
| 2004/0268347 A1 | 12/2004 | Knauerhase et al. | G06F 17/00 |
| 2005/0041031 A1 | 2/2005 | Diard | G06F 15/80 |
| 2005/0081115 A1 | 4/2005 | Cheng et al. | G06F 11/00 |
| 2005/0122330 A1 | 6/2005 | Boyd et al. | G06T 1/00 |
| 2005/0162437 A1 | 7/2005 | Morein et al. | G09G 5/36 |
| 2005/0166207 A1 | 7/2005 | Baba et al. | G06F 9/46 |
| 2005/0190189 A1 | 9/2005 | Chefd'hotel et al. | G06T 1/100 |
| 2005/0190190 A1 | 9/2005 | Diard et al. | G06F 15/16 |
| 2005/0195186 A1 | 9/2005 | Mitchell et al. | G06T 15/40 |
| 2005/0195187 A1 | 9/2005 | Seiler et al. | G06T 1/20 |
| 2005/0206646 A1 | 9/2005 | Alcorn | G06T 1/20 |
| 2005/0223124 A1 | 10/2005 | Reed | G06F 13/14 |
| 2005/0225558 A1 | 10/2005 | Morein et al. | G09G 5/00 |
| 2005/0237327 A1 | 10/2005 | Rubinstein et al. | G06F 15/80 |
| 2005/0237329 A1 | 10/2005 | Rubinstein et al. | G09G 5/39 |
| 2005/0243096 A1 | 11/2005 | Possley et al. | G06F 13/14 |
| 2005/0243215 A1 | 11/2005 | Doswald et al. | H04N 5/217 |
| 2005/0259103 A1 | 11/2005 | Kilgard et al. | G09G 5/00 |
| 2005/0265064 A1 | 12/2005 | Ku et al. | G11C 13/00 |
| 2005/0275760 A1 | 12/2005 | Gritz et al. | H04N 3/23 |
| 2006/0005178 A1 | 1/2006 | Kilgard et al. | G06F 9/45 |
| 2006/0028478 A1 | 2/2006 | Rubinstein et al. | G06F 13/14 |
| 2006/0055695 A1 | 3/2006 | Abdalla et al. | G06T 15/50 |
| 2006/0059494 A1 | 3/2006 | Wexler et al. | G06F 9/46 |
| 2006/0101218 A1 | 5/2006 | Reed | G06F 13/00 |
| 2006/0114260 A1 | 6/2006 | Diard | G06F 15/80 |
| 2006/0119607 A1 | 6/2006 | Lindholm et al. | G06T 11/40 |
| 2006/0120376 A1 | 6/2006 | Duncan et al. | H04L 12/56 |
| 2006/0123142 A1 | 6/2006 | Duncan et al. | G06F 3/00 |
| 2006/0156399 A1 | 7/2006 | Parmer et al. | G06F 12/14 |
| 2006/0202941 A1 | 9/2006 | Morein et al. | G09G 3/36 |
| 2006/0208960 A1 | 9/2006 | Glen | G09G 5/00 |
| 2006/0221086 A1 | 10/2006 | Diard | G06F 15/80 |
| 2006/0221087 A1 | 10/2006 | Diard | G06F 15/80 |
| 2006/0225061 A1 | 10/2006 | Ludwig et al. | G06F 9/45 |
| 2006/0248241 A1 | 11/2006 | Danilak | G06F 3/00 |
| 2006/0267987 A1 | 11/2006 | Litchmanov | G06F 15/16 |
| 2006/0268005 A1 | 11/2006 | Hutchins et al. | G09G 5/00 |
| 2006/0271713 A1 | 11/2006 | Xie et al. | G06F 13/00 |
| 2006/0274073 A1 | 12/2006 | Johnson et al. | |
| 2006/0282604 A1 | 12/2006 | Temkine et al. | G06F 13/36 |
| 2006/0290700 A1 | 12/2006 | Gonzalez et al. | G06F 15/16 |
| 2007/0159488 A1 | 7/2007 | Danskin et al. | G06F 15/80 |
| 2007/0195099 A1 | 8/2007 | Diard et al. | G06T 1/00 |
| 2008/0007559 A1 | 1/2008 | Kalaiah et al. | G06F 15/00 |
| 2008/0143731 A1 | 6/2008 | Cheng et al. | G06F 15/16 |
| 2008/0256330 A1 | 10/2008 | Wang et al. | G06F 15/00 |

OTHER PUBLICATIONS

PCT/IB07/03464, Sep. 22, 2008.
PCT/US07/26466, Jul. 16, 2008.
PCT/IB06/01529, Dec. 31, 2007.
PCT/IL04/001069, Jun. 30, 2005.
Antonio Garcia and Han-Wei Shen "An Interleaved Parallel Volume Render With PC-clusters", Proceedings of the Fourth Eurographics Workshop on Parallel Graphics and Visualization, 19 pages, 2002.
Erik Reinhard and Chuck Hansen, "A Comparison of Parallel Compositing Techniques on Shared Memory Architectures", Accepted for the Eurographics Workshop on Parallel Graphics and Visualisation, Girona, Spain, 9 pages, Sep. 2000.
Steven Molnar, "Combining Z-buffer Engines for Higher-Speed Rendering", Proceedings of the 1988 Eurographics Workshop on Graphics Hardware, 11 pages, 1988.
John Eyles et al., "PixelFlow: The Realization," SIGGRAPH/EUROGRAPHICS Conference on Graphics Hardware, 13 pages, 1997.
Powerpoint presentation entitled, "Go Multiple" by Dennis Yang, Conference Platform , 2007,11 pages.
Scientific publication entitled, "Chromium; A Stream-Processing Framework for Interactive Rendering on Clusters" from Stanford University, Lawrence Livermore National Laboratory, and IBM T.J. Watson Research Center, 2007,10 pages.
Princeton University document entitled "Hybrid Sort-First and Sort-Last Parallel Rendering with a Cluster of PCs," Samanta et al., Princeton University Department of Energy, Aug. 21, 2000, pp. 97-108.
Silicon Graphics, Inc. pdf. document entitled "OpenGL Multipipe™ SDK White Paper", 2002,2003, pp. 1-32.
Silicon Graphics, Inc. online document entitled "Additional Information for: OpenGL Multipipe™ SDK White Paper (IRIX 6.5)", published Feb. 1, 2003, 2 pages.
Publication by TW Crockett entitled, "An Introduction to Parallel Rendering", in Parallel Computing, 1997, Elsevier Science, 29 pages.
Technical publication by Li et al entiteled "ParVox—A Parallel Splatting Volume Rendering System for Distributed Visualization," Oct. 1997, 7 pages.
Department of Computer Science, University of North Carolina publication by Molnar et al. entitled, "PixelFlow: High-Speed Rendering Using Image Composition," 1992, 10 pages.

\* cited by examiner

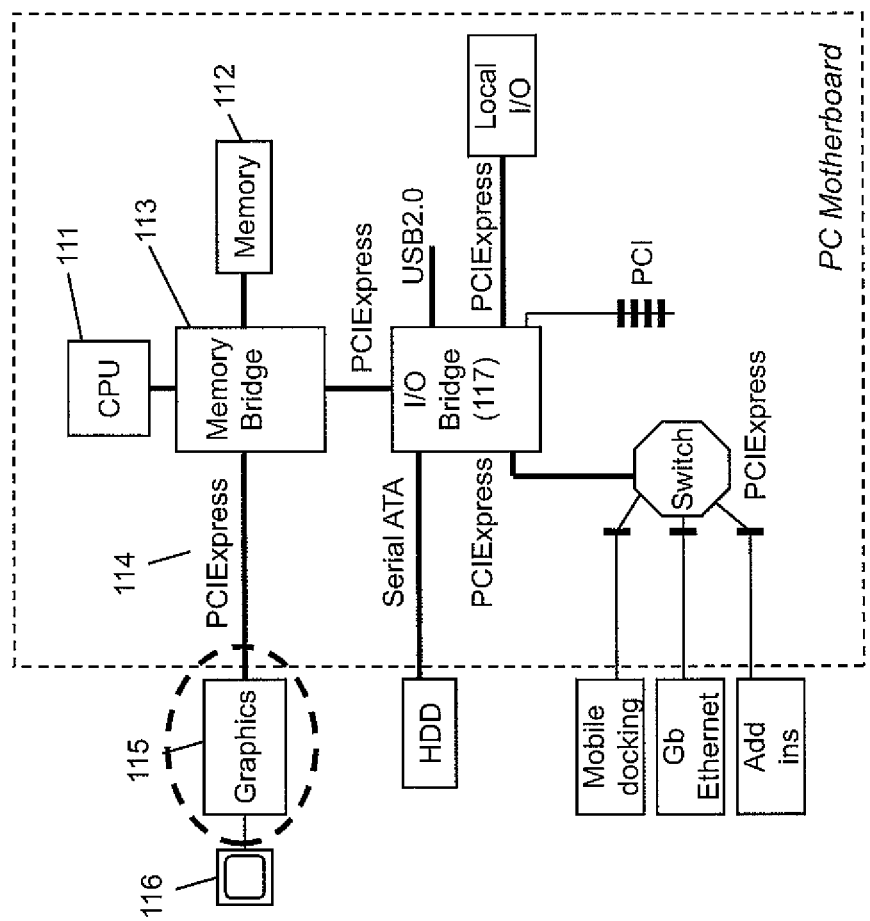
FIG. 1A1

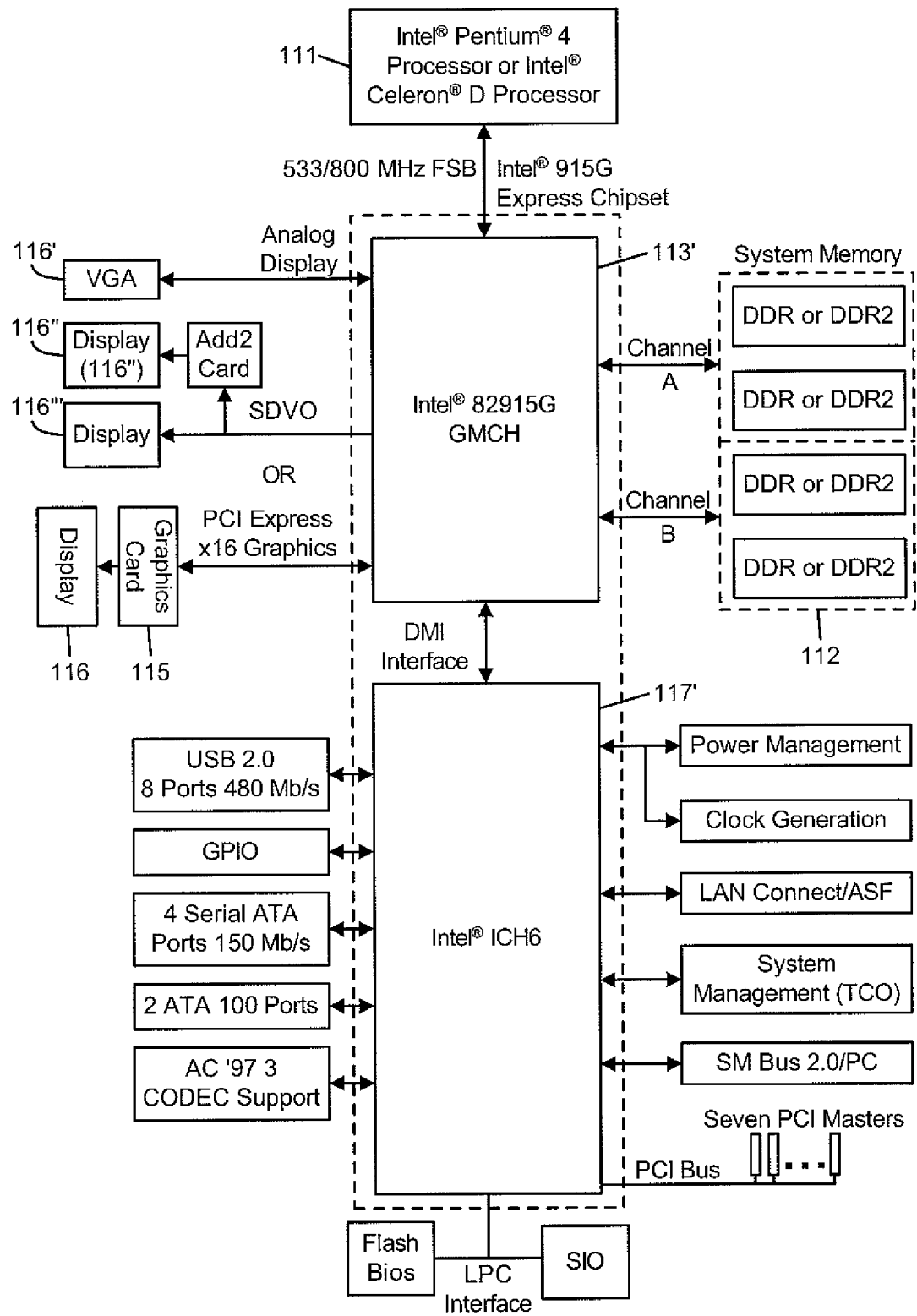
FIG. 1A2

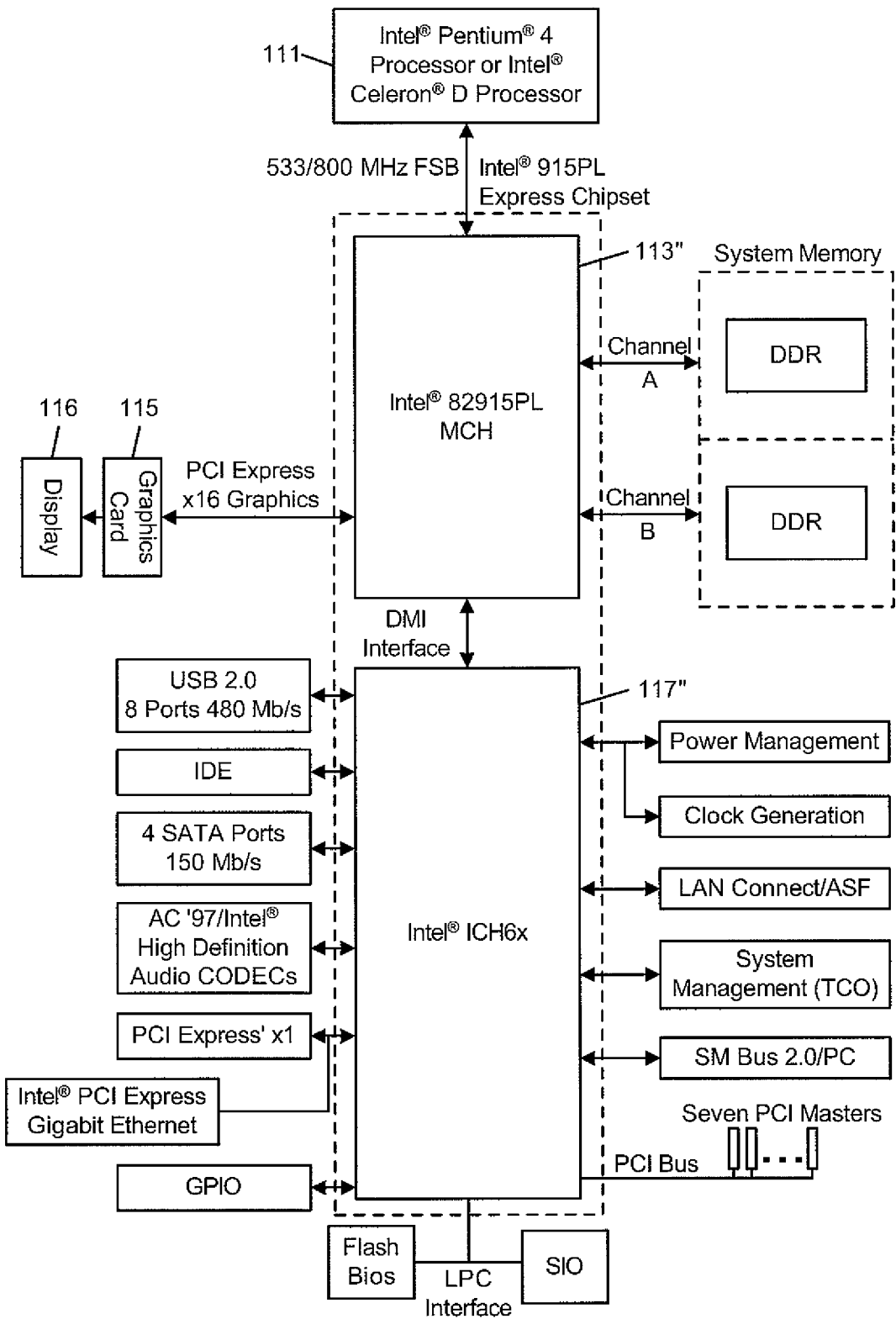
FIG. 1A3

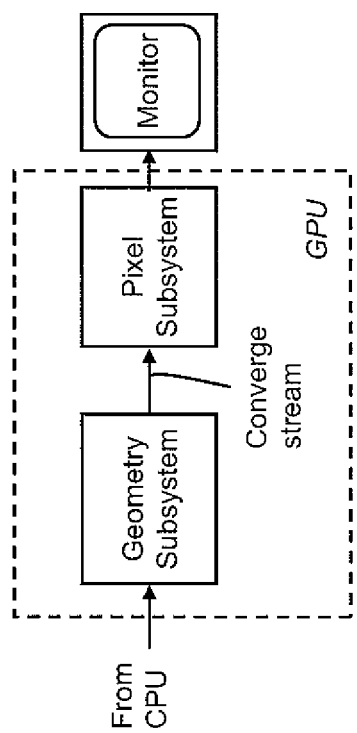
FIG. 2A1

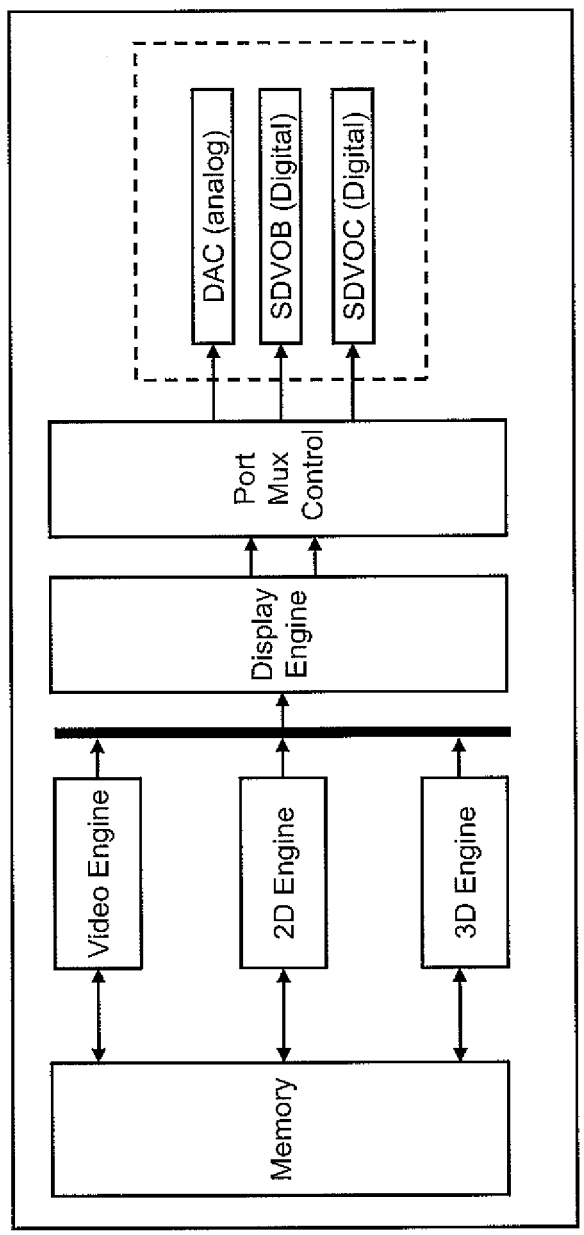
FIG. 2A2

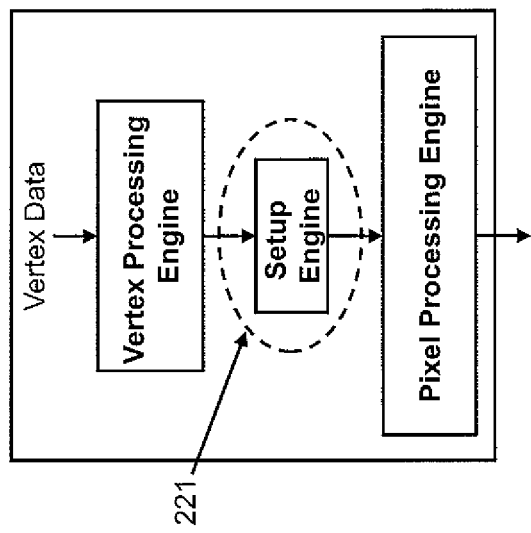
FIG. 2B2
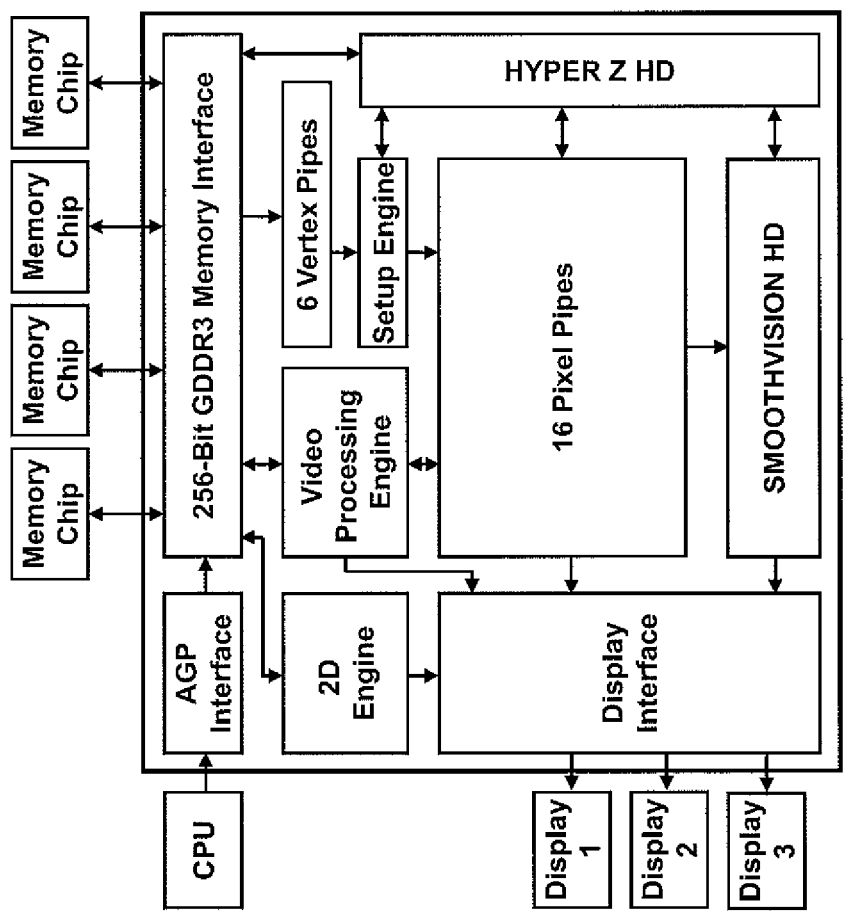
FIG. 2B1

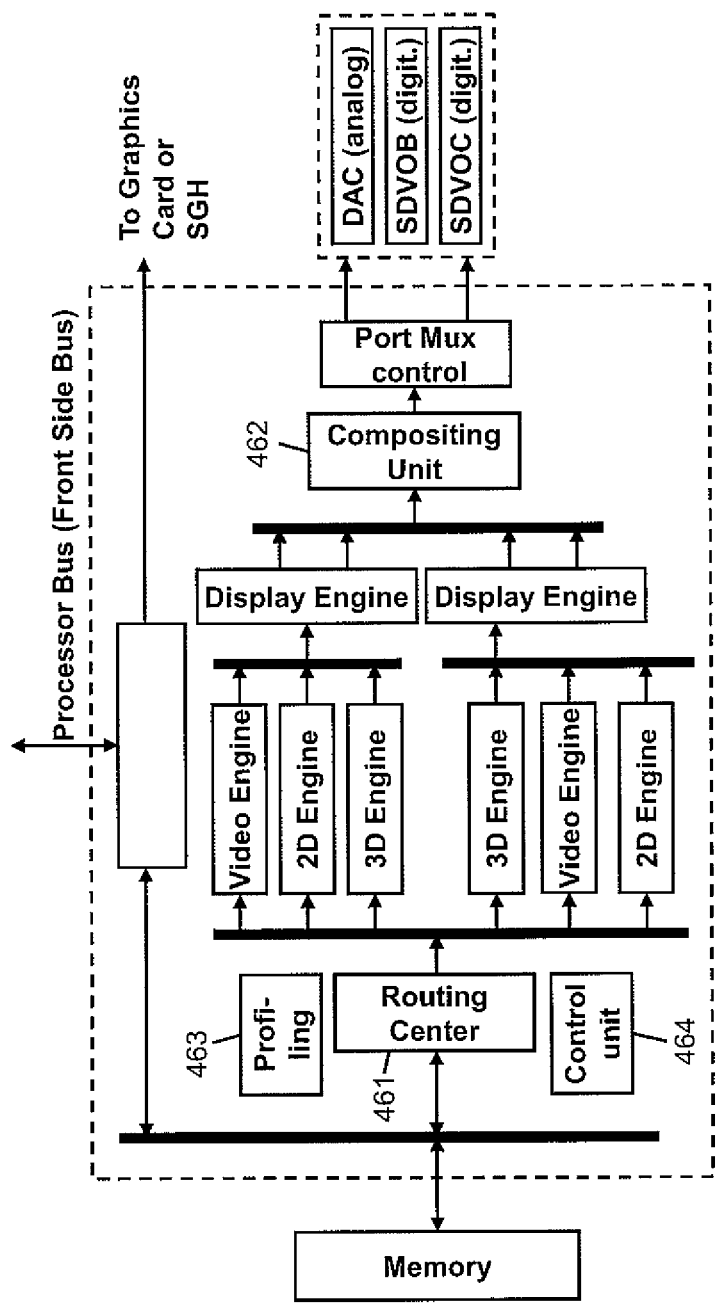
FIG. 5A1

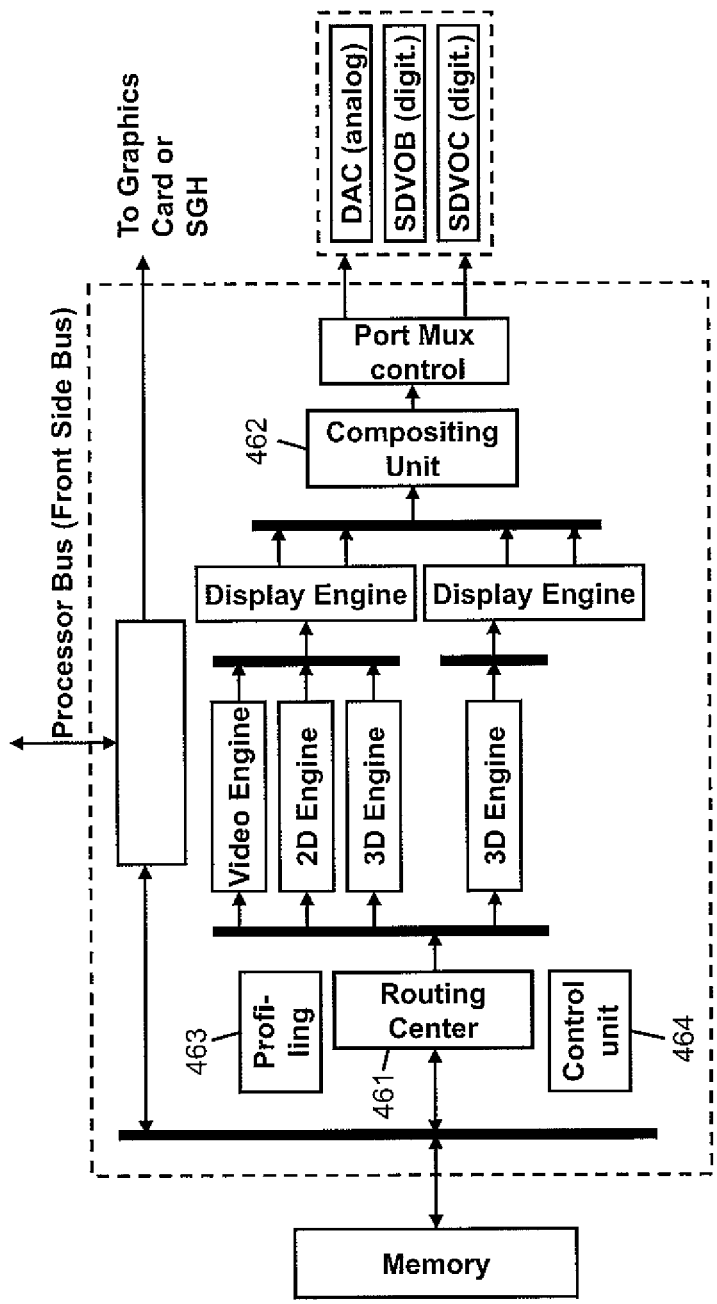
FIG. 5A2

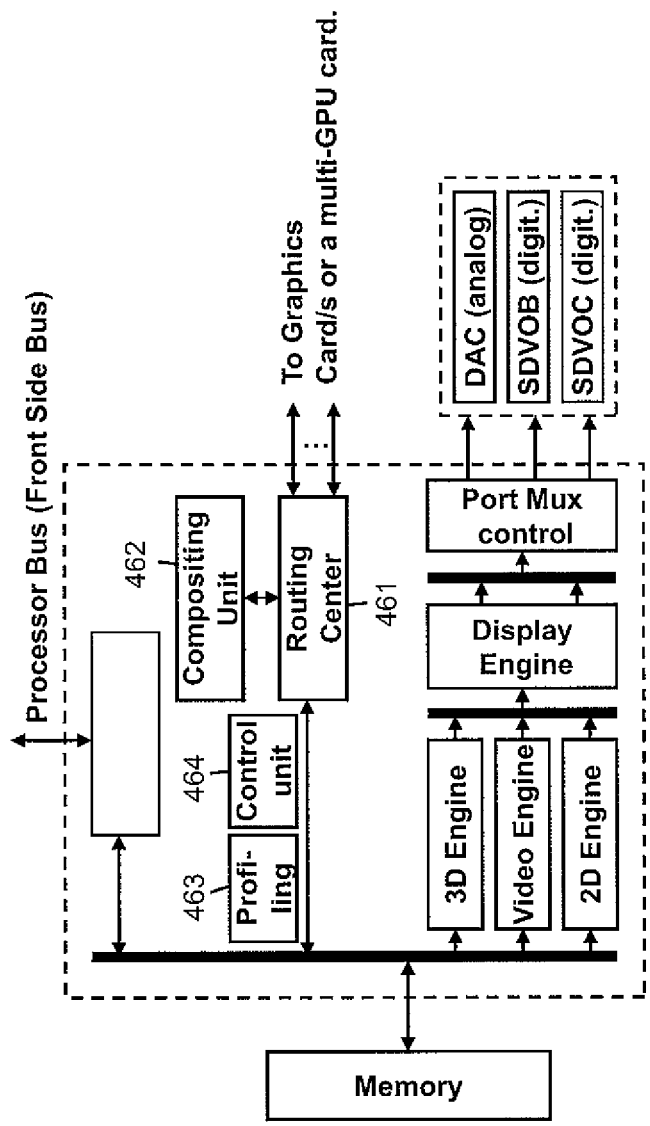
FIG. 5A3

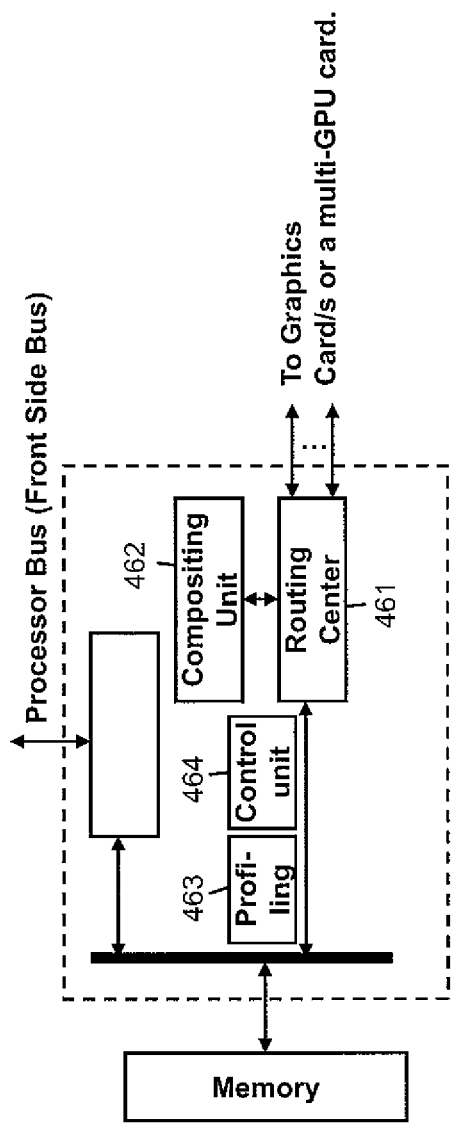
FIG. 5A4

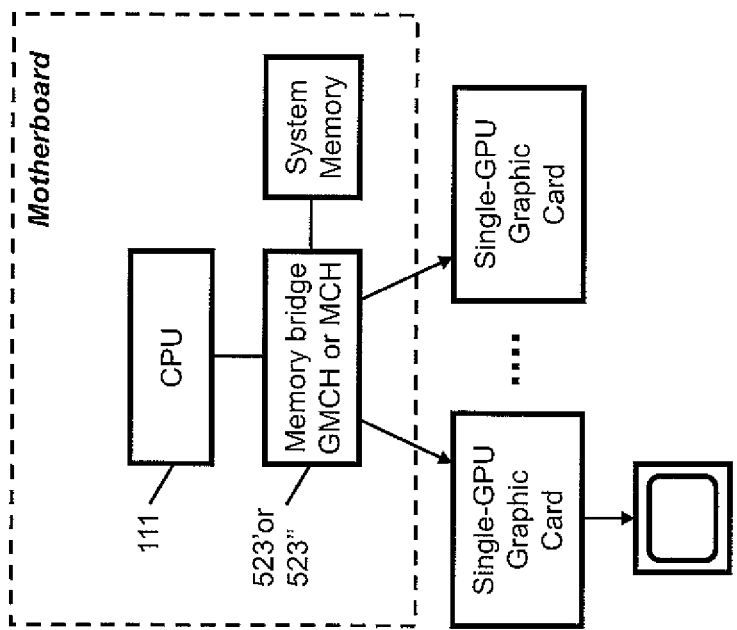
FIG. 5B2
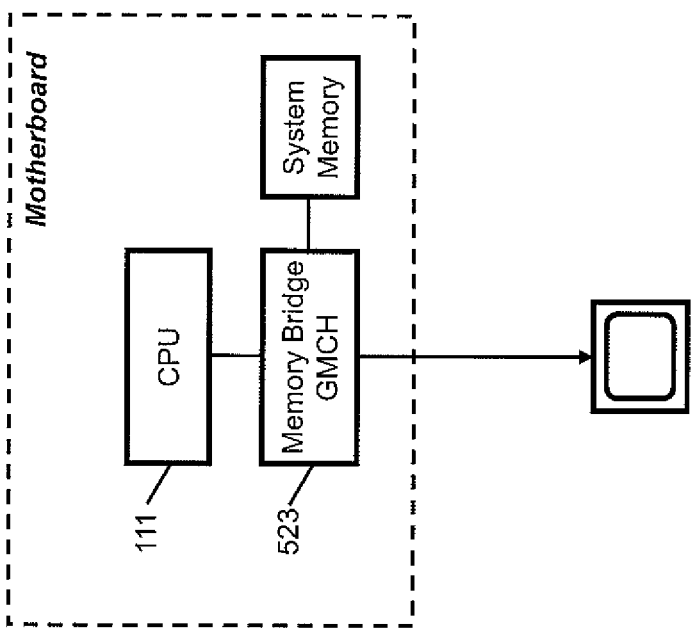
FIG. 5B1

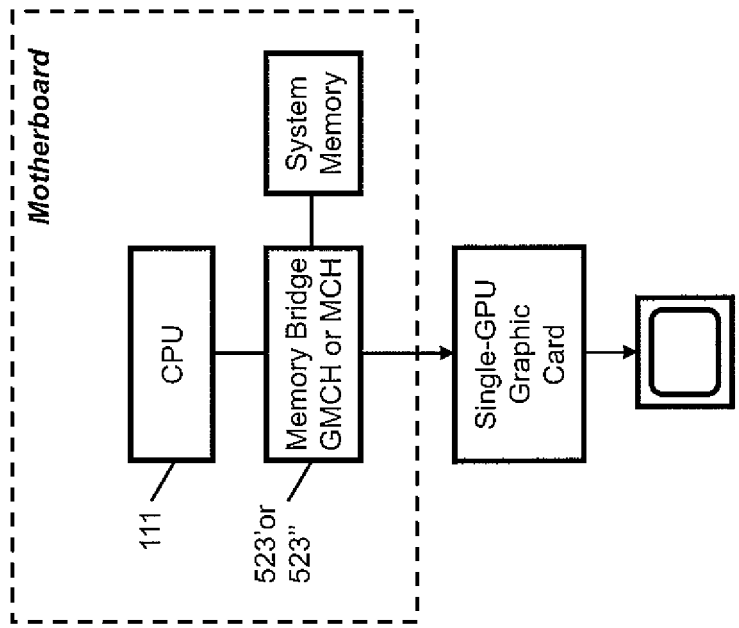
FIG. 5B4
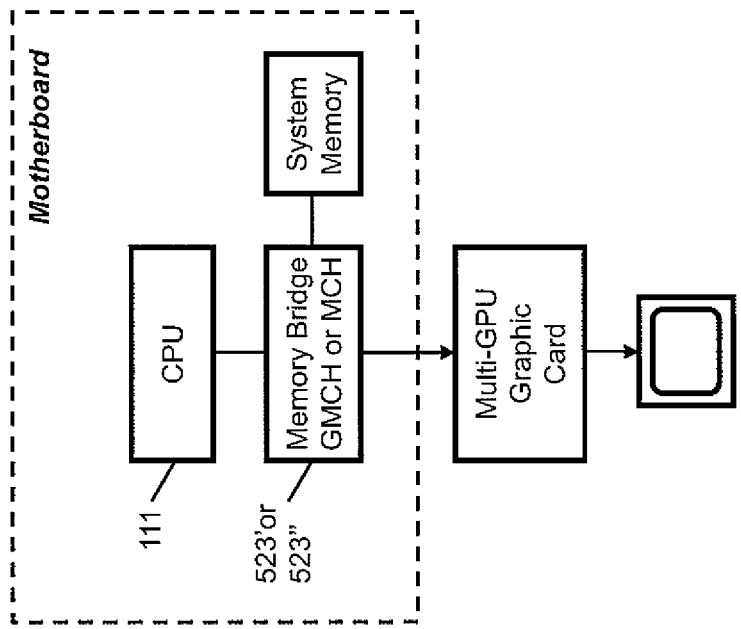
FIG. 5B3

SILICON CHIP OF A MONOLITHIC CONSTRUCTION FOR USE IN IMPLEMENTING MULTIPLE GRAPHIC CORES IN A GRAPHICS PROCESSING AND DISPLAY SUBSYSTEM

RELATED CASES

This Application is a Continuation of U.S. application Ser. No. 11/386,454 filed Mar. 22, 2006 now U.S. Pat. No. 7,834,880; which is a Continuation-in-Part (CIP) of U.S. application Ser. No. 11/340,402 filed on Jan. 25, 2006 now U.S. Pat. No. 7,812,844, which is a CIP of: provisional Application No. 60/647,146 filed Jan. 25, 2005; International Application No. PCT/IL2004/000079 filed Jan. 28, 2004, published as WIPO Publication No. WO 2004/070652 A2 on Aug. 19, 2004; International Application No. PCT/IL2004/001069 filed Nov. 19, 2004, published as WIPO Publication No. WO 2005/050557 A2 on Jun. 2, 2005, and entered in the U.S. National Stage on May 17, 2006 as U.S. application Ser. No. 10/579,682, and based on U.S. provisional Application Nos. 60/523,084 and 60/523,102, both filed Nov. 19, 2003; each said Application being commonly owned by Lucid Information Technology Ltd, of Israel, and incorporated herein by reference as if set forth fully herein.

BACKGROUND OF INVENTION

Field of the Invention

Over the past few decades, much of the research and development in the graphics architecture field has been concerned the ways to improve the performance of three-dimensional (3D) computer graphics rendering. Graphics architecture is driven by the same advances in semiconductor technology that have driven general-purpose computer architecture. Many of the same acceleration techniques have been used in this field, including pipelining and parallelism. The graphics rendering application, however, imposes special demands and makes available new opportunities. For example, since image display generally involves a large number of repetitive calculations, it can more easily exploit massive parallelism than can general-purpose computations.

In high-performance graphics systems, the number of computations highly exceeds the capabilities of a single processing unit, so parallel systems have become the rule of graphics architectures. A very high-level of parallelism is applied today in silicon-based graphics processing units (GPU), to perform graphics computations. Typically these computations are performed by graphics pipeline, supported by video memory, which are part of a graphic system.

FIG. 1A1 shows a conventional graphic system as part of a PC architecture, comprising: a CPU (111), system memory (112), chipset (113, 117), high speed CPU-GPU bus (114) (e.g. PCI express 16x), video (graphic) card (115) based on a single GPU, and display (116). FIG. 1A2 shows prior art chipset 113 and 117 being realized using Intel's chipsets comprising the 82915G chip (i.e. a Graphics and Memory Controller Hub with an integrated graphics device IGD, also called the "NorthBridge" chip) and the ICH6 chip, called the I/O hub. In FIG. 1A3, another prior art chipset 113, 117 is realized using Intel's chipset comprising the 82915PL chip (i.e. the Memory Controller Hub (MCH) without an integrated graphics device IGD, also called the NorthBridge chip) and the ICH6x chip (i.e. the I/O hub). Examples of other NorthBridge chips include: AMD-761 by Advanced Micro Devices (AMD); K8T900 by VIA; CrossFire Xpress 3200 chipset by ATI; nForce4 by Nvidia; and SIS662 by SIS.

In addition to driving the system memory (123), the GMCH 113' includes an integrated graphics device (IGD) that is capable of driving up to three displays (116'''). Notably, the GMCH 113' does not support a dedicated local graphics memory; instead it uses part of the system memory 112. Also GMCH 113' has the capability of supporting external graphics accelerators (115) via the PCI Express Graphics port but cannot work concurrently with the integrated graphics device (IGD). As shown in FIG. 1A3, the Memory Controller Hub (MCH) (i.e. 82915PL) 113'' supports external graphics (115, 116) only, and provides no integrated graphics device (IGD) support, as GMCH 113' in FIG. 1A2. Also, prior art Intel® chipsets 113' and 113'' lack generic capabilities for driving the GPUs of other major vendors, and are unable to support Nvidia's SLI graphics cards.

As shown in FIG. 2A1, the single GPU graphic pipeline can be decomposed into two major components: a geometry subsystem for processing 3D graphics primitives (e.g. polygons); and a pixel subsystem for computing pixel values. These two components are consistently designed for increased parallelism. As shown in FIG. 2A2, graphics pipeline of a prior art integrated graphics device (IGD) is shown comprising: a memory controller for feeding a video engine, a 2D engine and a 3D engine, which feeds a display engine, which in turn, feeds a Port Mux Controller along the way to an analog or digital display.

In the geometry subsystem, the graphics databases are regular, typically consisting of a large number of primitives that receive nearly identical processing; therefore the natural concurrency is to partition the data into separate streams and to process them independently. In the pixel subsystem, image parallelism has long been an attractive approach for high-speed rasterization architectures, since pixels can be generated in parallel in many ways. An example of a highly parallel Graphic Processing Unit chip (GPU) in prior art is depicted in FIG. 2B1 (taken from 3D Architecture White Paper, by ATI). The geometry subsystem consists of six (6) parallel pipes while the pixel subsystem has sixteen (16) parallel pipes.

However, as shown in FIG. 2B2, the "converge stage" 221 between these two subsystems is very problematic as it must handle the full data stream bandwidth. In the pixel subsystem, the multiple streams of transformed and clipped primitives must be directed to the processors doing rasterization. This can require sorting primitives based on spatial information while different processors are assigned to different screen regions. A second difficulty in the parallel pixel stage is that ordering of data may change as those data pass through parallel processors. For example, one processor may transform two small primitives before another processor transforms a single, large one. Certain global commands, such as commands to update one window instead of another, or to switch between double buffers, require that data be synchronized before and after command. This converge stage between the geometry and pixel stages, restricts the parallelism in a single GPU.

A typical technology increasing the level of parallelism employs multiple GPU-cards, or multiple GPU chips on a card, where the rendering performance is additionally improved, beyond the converge limitation in a single core GPU. This technique is practiced today by several academic researches (e.g. Chromium parallel graphics system by Stanford University) and commercial products (e.g. SLI—a dual GPU system by Nvidia, Crossfire—a dual GPU by ATI). FIG. 3 shows a commercial dual GPU system, Asus A8N-SLI, based on Nvidia SLI technology.

Parallelization is capable of increasing performance by releasing bottlenecks in graphic systems. FIG. 2C indicates typical bottlenecks in a graphic pipeline that breaks-down into segmented stages of bus transfer, geometric processing and fragment fill bound processing. A given pipeline is only as strong as the weakest link of one of the above stages, thus the main bottleneck determines overall throughput. As indicated in FIG. 2C, pipeline bottlenecks stem from: (231) geometry, texture, animation and meta data transfer; (232) geometry data memory limits; (233) texture data memory limits; (234) geometry transformations; and (235) fragment rendering.

There are different ways to parallelize the GPUs, such as: time-division (each GPU renders the next successive frame); image-division (each GPU renders a subset of the pixels of each frame); and object-division (each GPU renders a subset of the whole data, including geometry and textures), and derivatives and combinations of thereof. Although promising, this approach of parallelizing cluster of GPU chips suffers from some inherent problems, such as: restricted bandwidth of inter-GPU communication; mechanical complexity (e.g. size, power, and heat); redundancy of components; and high cost.

Thus, there is a great need in the art for an improved method of and apparatus for high-speed graphics processing and display, which avoids the shortcomings and drawbacks of such prior art apparatus and methodologies.

OBJECTS AND SUMMARY OF THE PRESENT INVENTION

Accordingly, a primary object of the present invention is to provide a novel method of and apparatus for high-speed graphics processing and display, which avoid the shortcomings and drawbacks of prior art apparatus and methodologies.

Another object of the present invention is to provide a novel graphics processing and display system having multiple graphics cores with unlimited graphics parallelism, getting around the inherent converge bottleneck of a single GPU system.

Another object of the present invention is to provide a novel graphics processing and display system which ensures the best graphics performance, eliminating the shortages of a multi-chip system, the restricted bandwidth of inter-GPU communication, mechanical complexity (size, power, and heat), redundancy of components, and high cost.

Another object of the present invention is to provide a novel graphics processing and display system that has an amplified graphics processing and display power by parallelizing multiple graphic cores in a single silicon chip.

Another object of the present invention is to provide a novel graphics processing and display system that is realized on a silicon chip having a non-restricted number of multiple graphic cores.

Another object of the present invention is to provide a novel graphics processing and display system that is realized on a silicon chip which utilizes a cluster of multiple graphic cores.

Another object of the present invention is to provide a novel graphics processing and display system that is realized on a silicon chip having multiple graphic cores or pipes (i.e. a multiple-pipe system-on-chip, or MP-SOC) and providing architectural flexibility to achieve the advanced parallel graphics display performance.

Another object of the present invention is to provide a novel graphics processing and display system that is realized on a silicon chip having multiple graphic cores, and adaptively supporting different modes of parallelism within both its geometry and pixel processing subsystems.

Another object of the present invention is to provide a novel graphics processing and display system that is realized on a silicon chip having multiple GPU cores, and providing adaptivity for highly advanced graphics processing and display performance.

Another object of the present invention is to provide a novel graphics processing and display system and method, wherein the graphic pipeline bottlenecks of vertex (i.e. 3D polygon geometry) processing and fragment processing are transparently and intelligently resolved.

Another object of the present invention to provide a method and system for an intelligent decomposition of data and graphic commands, preserving the basic features of graphic libraries as state machines and tightly sticking to the graphic standard.

Another object of the present invention to provide a new PCI graphics card supporting a graphics processing and display system realized on a silicon chip having multiple graphic cores, and providing architectural flexibility to achieve the best parallel performance.

Another object of the present invention to provide a computing system having improved graphics processing and display capabilities, employing a graphics card having a silicon chip with multiple graphic cores, and providing architectural flexibility to achieve the best parallel performance.

Another object of the present invention is to provide a novel graphics processing and display system comprising multi-pipeline (MP) Core Logic circuitry including a routing center, a compositing unit, a control unit and a profiling functions module.

Another object of the present invention is to provide a Graphics and Memory Controller Hub (GMCH) chip comprising a graphics subsystem including dual Integrated Graphics Devices (IGDs) driven by the MP-CL circuitry of the present invention specified in FIG. 4F.

Another object of the present invention is to provide an improved NorthBridge chip that can be used to replace prior art NorthBridge chips employed in PC architectures, wherein the Northbridge chip of the present invention comprises a graphics subsystem including a dual 3D-pipeline driven by the MP-CL circuitry of the present invention.

Another object of the present invention is to provide a Graphics and Memory Controller Hub (GMCH) chip that can be used to replace prior art GMCH chips employed in PC architectures, wherein the GMCH chip of the present invention comprises a graphics subsystem including a dual 3D-pipeline driven by the MP-CL circuitry.

Another object of the present invention is to provide a Graphics and Memory Controller Hub (GMCH) that can be used to replace prior art GMCH chips employed in PC architectures, wherein the GMCH chip of the present invention comprises graphics subsystem including a single IGD and MP-CL circuitry integrated therein to drive external GPU cards.

Another object of the present invention is to provide a Memory Controller Hub (MCH) chip that can be used to replace prior art MCH chips employed in PC architectures, wherein the MCH chip of the present invention comprises MP-CL circuitry for driving external GPU cards, or a single card with multiple GPUs, or a single GPU card, and wherein only the routing center is used for passing data to and from the external GPUs.

Another object of the present invention is to provide a high performance computer graphics system employing a GMCH chip, wherein the graphics subsystem includes a dual IDG processor having the MP-CL circuitry of the present invention integrated therein, for driving a single display device.

Another object of the present invention is to provide a high performance computer graphics system employing a GMCH chip or a MCH chip, wherein the graphics subsystem includes the MP-CL circuitry of the present circuitry of the present invention integrated therein, for driving multiple single-GPU based graphics cards interfaced to multiple display devices.

Another object of the present invention is to provide a high performance computer graphics system employing either a GMCH chip or a MCH chip, wherein the graphics subsystem includes the MP-CL circuitry of the present invention integrated therein, for driving a multi-GPU based graphics card interfaced to a display device.

Another object of the present invention is to provide a high performance computer graphics system employing either a GMCH chip or a MCH chip, wherein MP-SOC Core Logic circuitry of the present invention is integrated therein, for driving a single-GPU based graphics card interfaced to a display device.

Another object of the present invention to provide such a computing system having improved graphics processing and display performance required by applications including, video-gaming, virtual reality, scientific visualization, and other interactive application requiring or demanding photorealistic graphics display capabilities.

These and other objects and advantages of the present invention will become apparent hereinafter.

BRIEF DESCRIPTION OF DRAWINGS OF THE PRESENT INVENTION

For a more complete understanding of how to practice the Objects of the Present Invention, the following Detailed Description of the Illustrative Embodiments can be read in conjunction with the accompanying Drawings, briefly described below, wherein:

FIG. 1A1 is a schematic representation of a prior art, standard PC architecture, in which its conventional single GPU graphic card is shown circled;

FIG. 1A2 is a schematic representation of a prior art, standard PC architecture employing Intel's Express chipset for the 82915G Graphics and Memory Controller Hub (GMCH);

FIG. 1A3 is a schematic representation of a prior art, standard PC architecture employing Intel's Express chipset for the 82915PL Memory Controller Hub (MCH), driving external graphics only;

FIG. 2A1 is a simplified block diagram of a prior art conventional graphics system employing a single GPU, having geometry and pixel processing subsystems, wherein the data converge stream between the subsystems presents a serious system bottleneck that significantly limits performance;

FIG. 2A2 is a schematic block diagram for the Integrated Graphics Device within the Intel 82915G Graphics and Memory Controller Hub (GMCH);

FIG. 2B1 is a simplified block diagram illustrating high parallelism in a typical prior art ATI X800 Graphic Processing Unit chip (GPU), wherein the geometry subsystem consists of 6 parallel pipes and the pixel subsystem consists of 16 parallel pipes;

FIG. 2B2 is a schematic diagram of the internal portion of a prior art graphic processing unit (GPU) chip (e.g. ATI X800) illustrating the bottlenecking converge stage (setup engine) between geometric and pixel parallel engines therein;

Figure 2C:
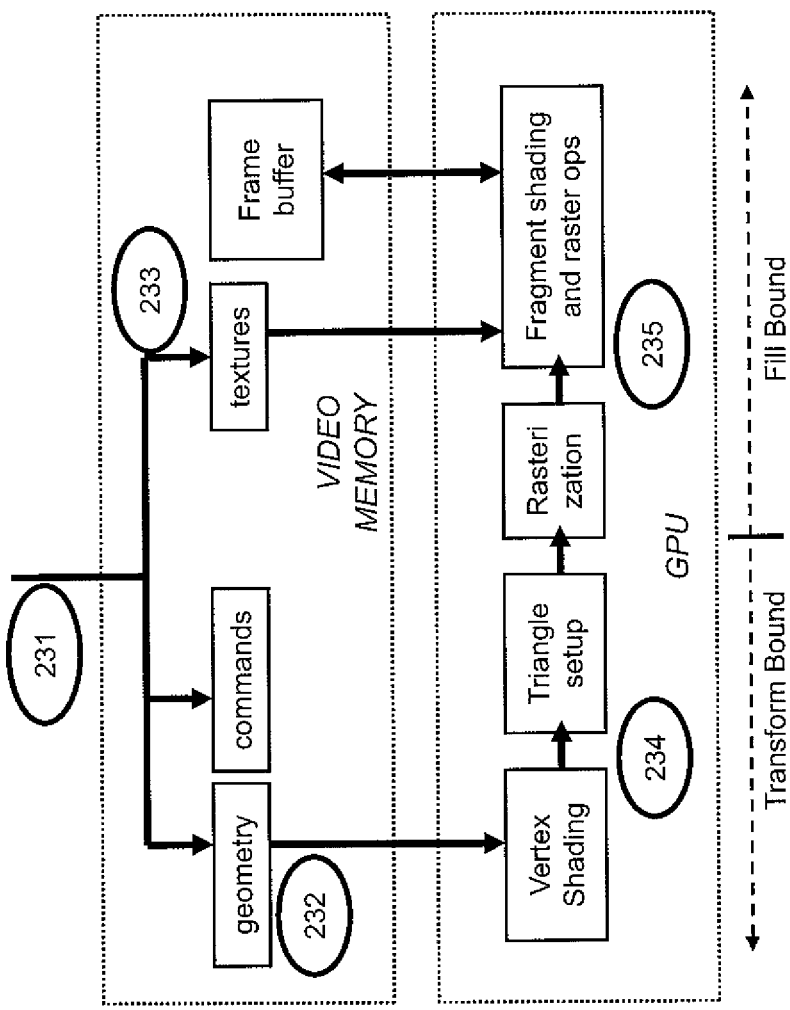
FIG. 2C is a schematic representation of a conventional graphics pipeline, illustrating the data bottleneck problem existing therein.
Figure 3:
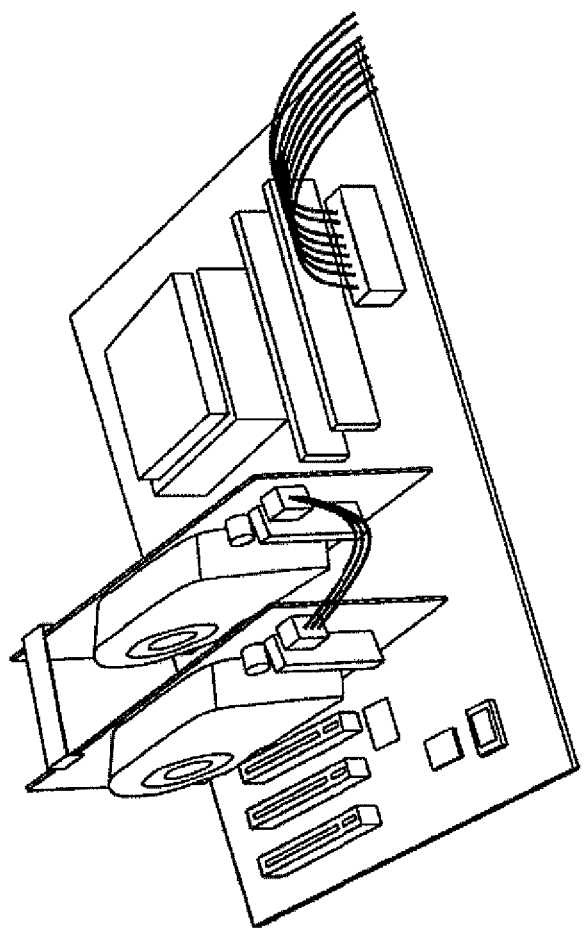
FIG. 3 is a photograph of a prior art dual GPU-driven video graphics card.
Figure 4B:
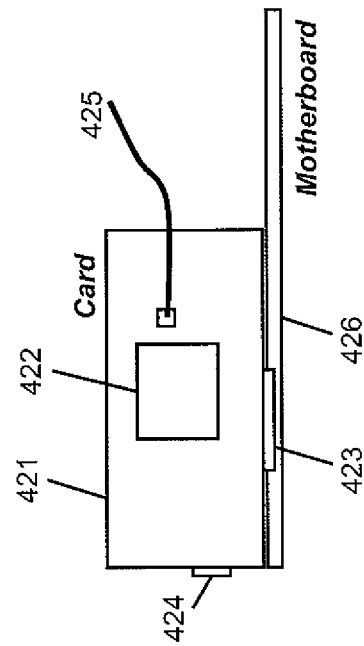
Figure 4A:
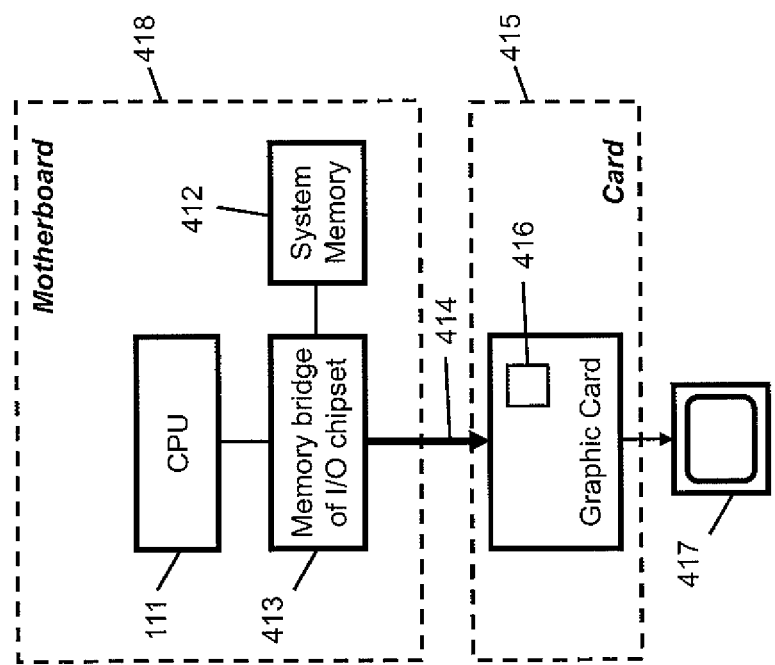
Figure 4C:
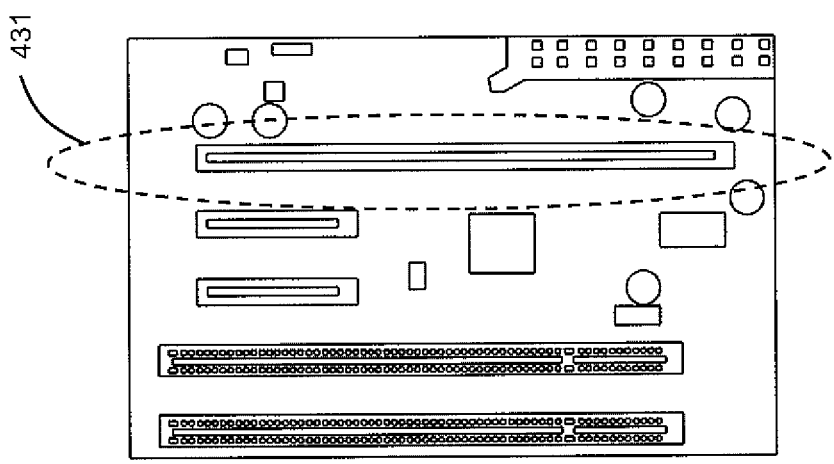
Figure 4E:
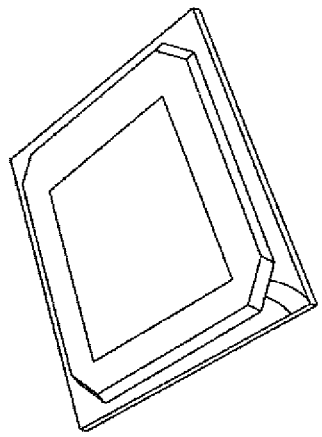
Figure 4D:
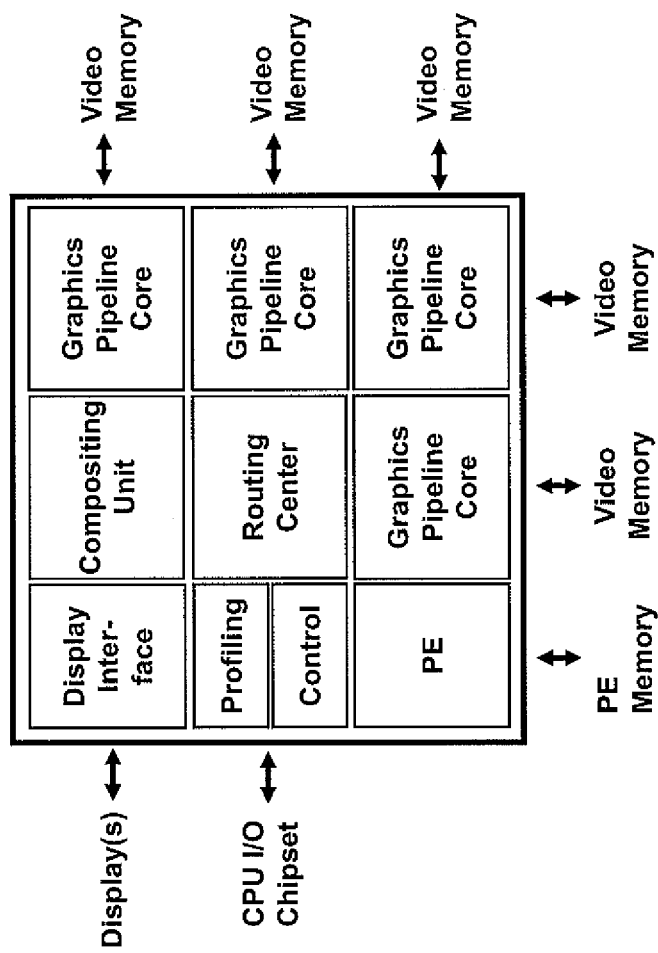
Figure 4F:
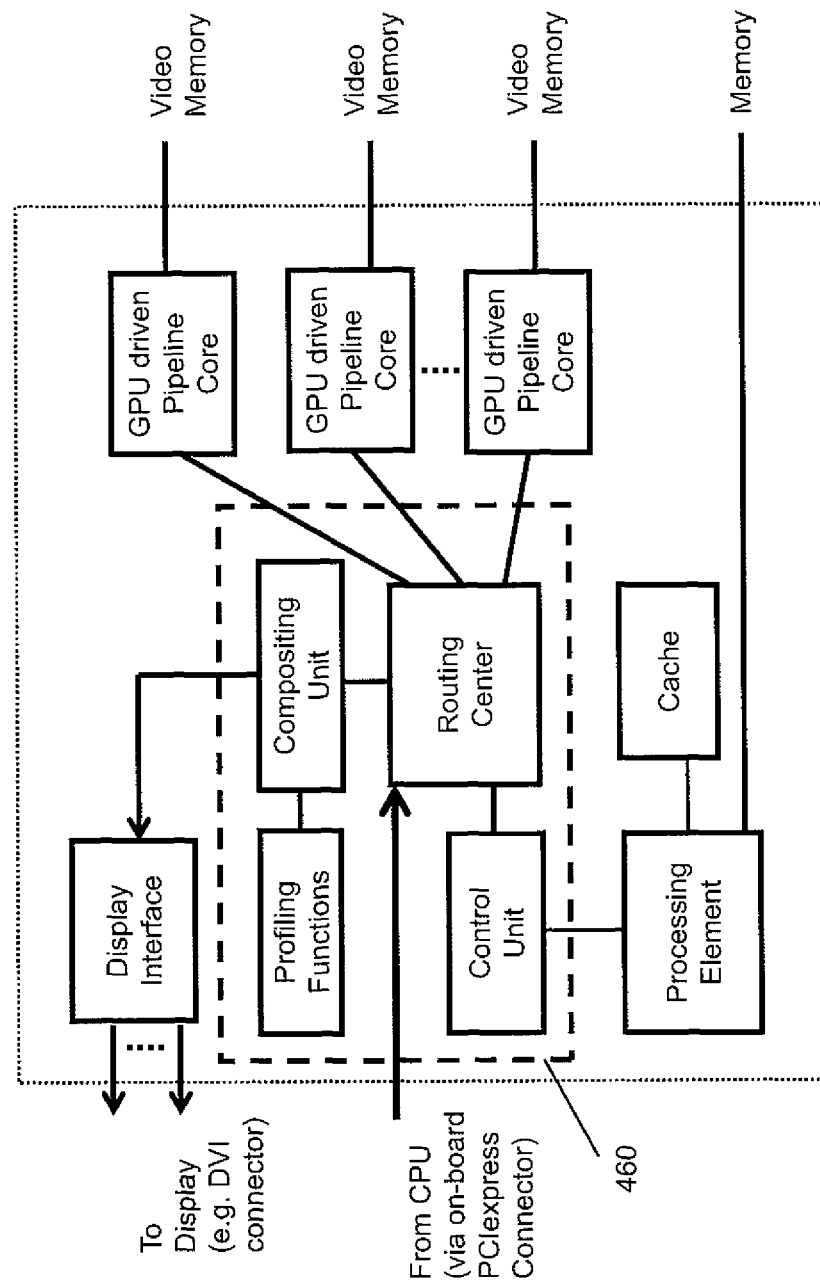

FIG. 4A is a schematic system block diagram representation of a graphic system based on printed circuit graphics card employing the multiple-pipe system-on-chip (MP-SOC) device in accordance with the principles of the present invention, wherein the system block diagram shows the CPU, the memory bridge of the I/O chipset, system memory, a printed-circuit (PC) video graphics board based on the MP-SOC of the present invention, and display screen(s);

FIG. 4B is schematic representation of the physical implementation of the MP-SOC of the present invention, mounted on a printed circuit (PC) video graphics board;

FIG. 4C is a photograph of a standard PCI express graphics slot on a motherboard to which the MP-SOC-based PC graphics board of the present invention is interconnected;

FIG. 4D is a schematic representation of an exemplary MP-SOC silicon-layout including four GPU-driven pipeline cores according to the principles of the present invention;

FIG. 4E is a schematic representation of an exemplary packaging of the MP-SOC chip of the present invention;

FIG. 4F is a schematic block diagram of the entire MP-SOC architecture, according to the illustrative embodiment of the present invention, wherein the core circuitry of the MP-SOC is outlined and its subcomponents (i.e. routing center, compositing unit, control unit and profiling functions) are labeled;

FIG. 5A1 is a block diagram of a first illustrative embodiment of the Graphics and Memory Controller Hub (GMCH) chip technology of the present invention (also known as a Memory Bridge or NorthBridge chip) that can be used to graphics subsystem as comprising dual-IGD (Integrated Graphics Devices) driven by the MP core circuitry of the present invention specified in FIG. 4F, and wherein the external graphics card is not MP-SOC driven;

FIG. 5A2 is a block diagram of a second illustrative embodiment of the Graphics and Memory Controller Hub (GMCH) chip technology of the present invention, wherein the MP-CL circuitry specified in FIG. 4F is integrated with the dual 3D pipelines (IGDs) of its graphics subsystem, for driving external GPU-based graphics card;

FIG. 5A3 is a block diagram of a third illustrative embodiment of the GMCH chip technology of the present invention, wherein the MP-CL circuitry specified in FIG. 4F is integrated with the single IGD of its graphics subsystem, for driving external GPU-based graphics cards.

Figure 6:
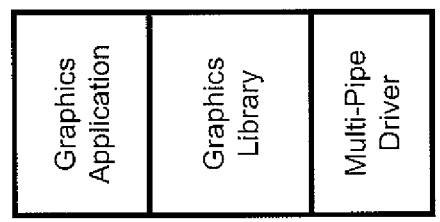
Figure 7A:
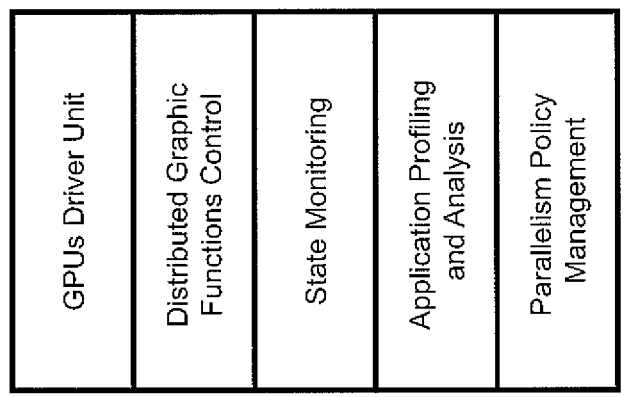
Figure 7B:
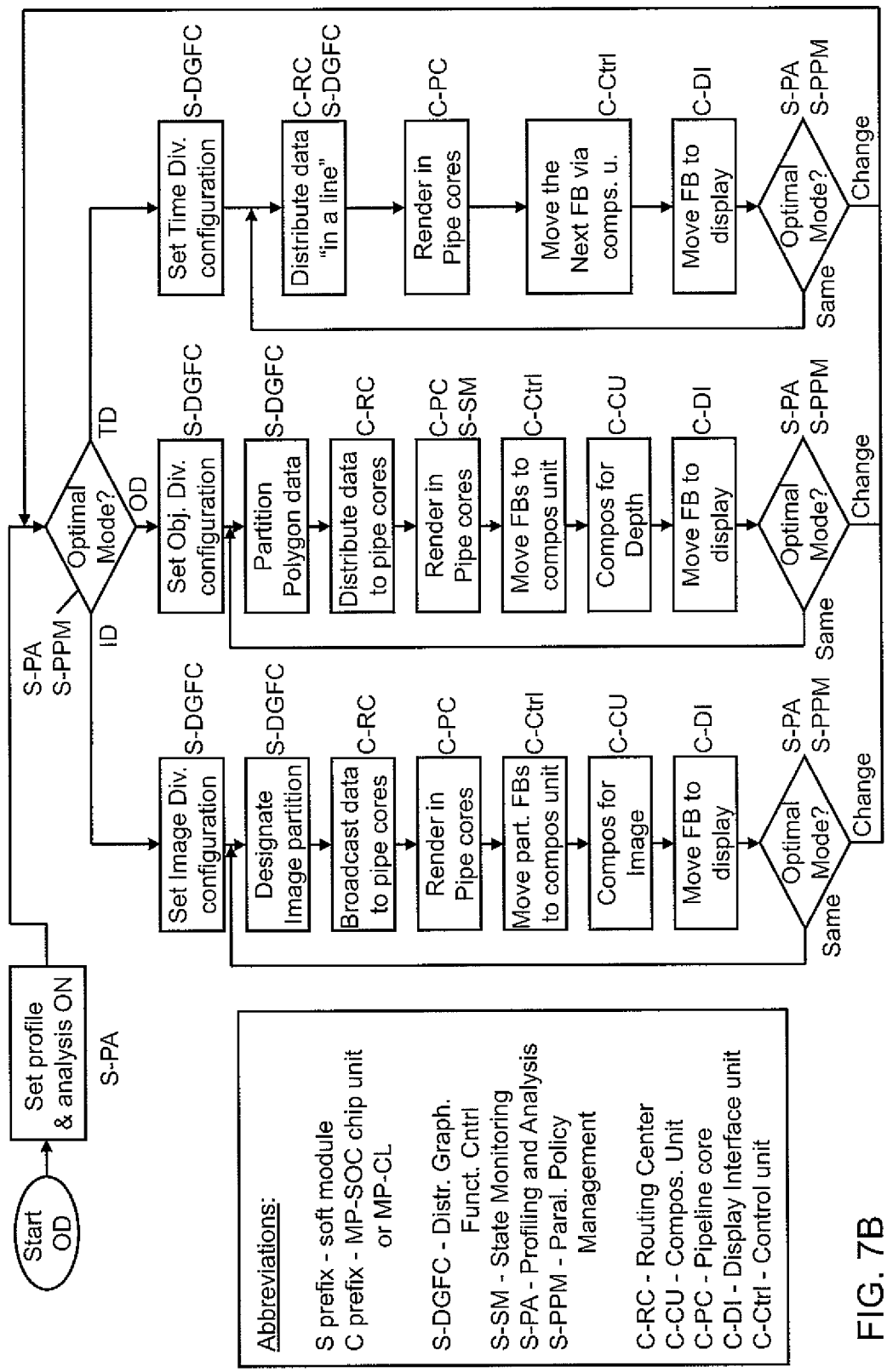
Figure 8:
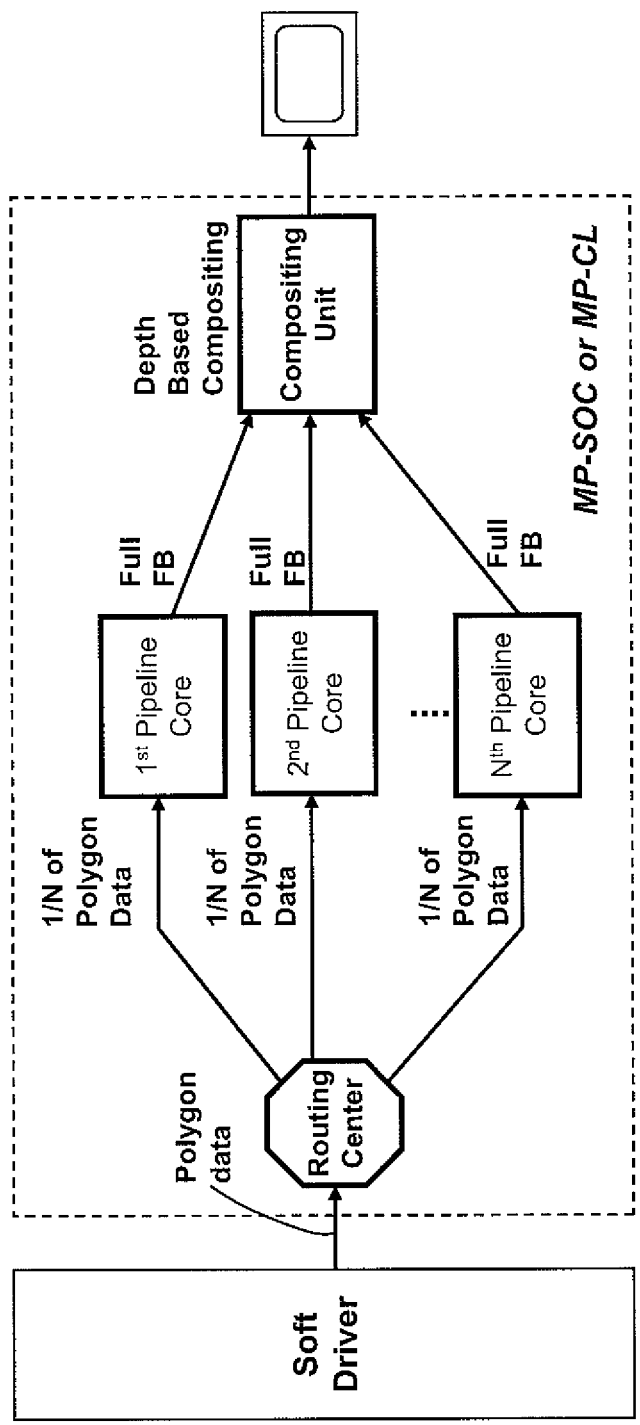
Figure 9:
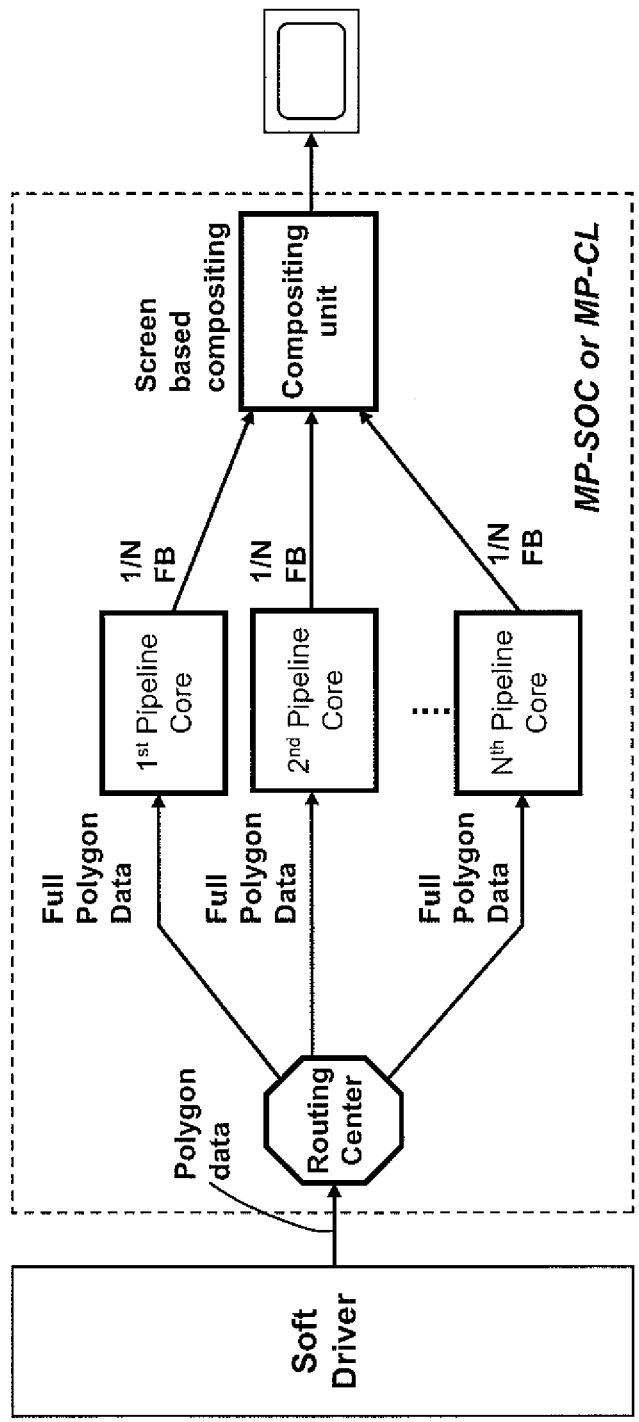
Figure 10:
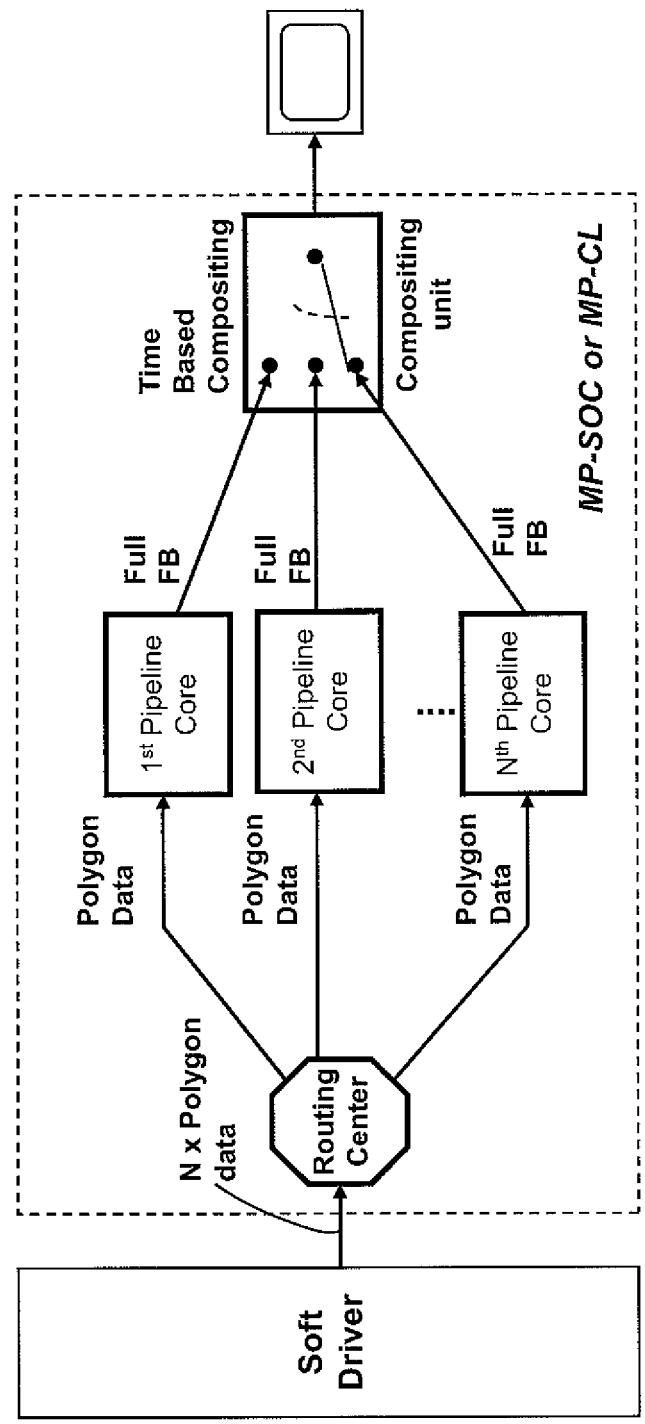
Figure 11:
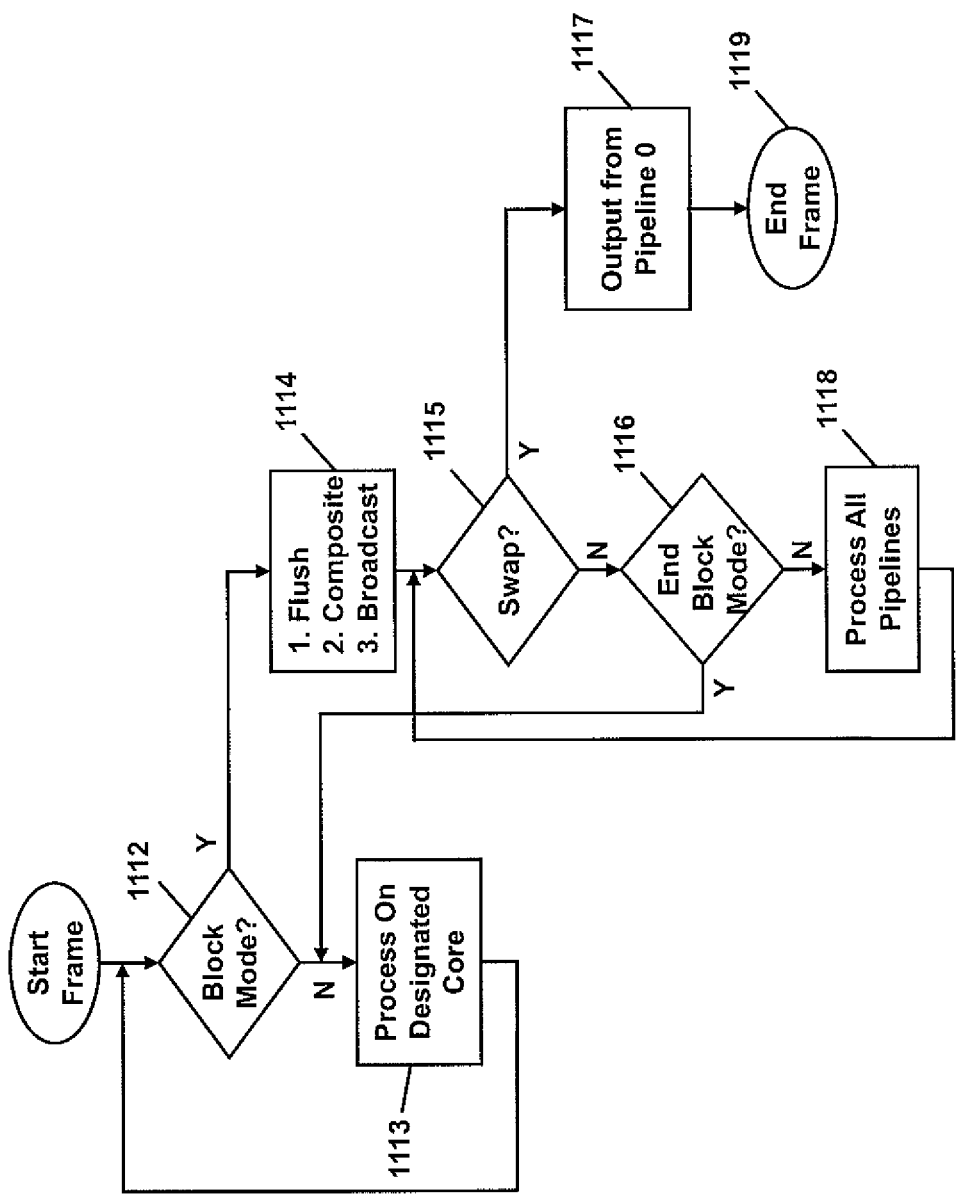
Figure 12:
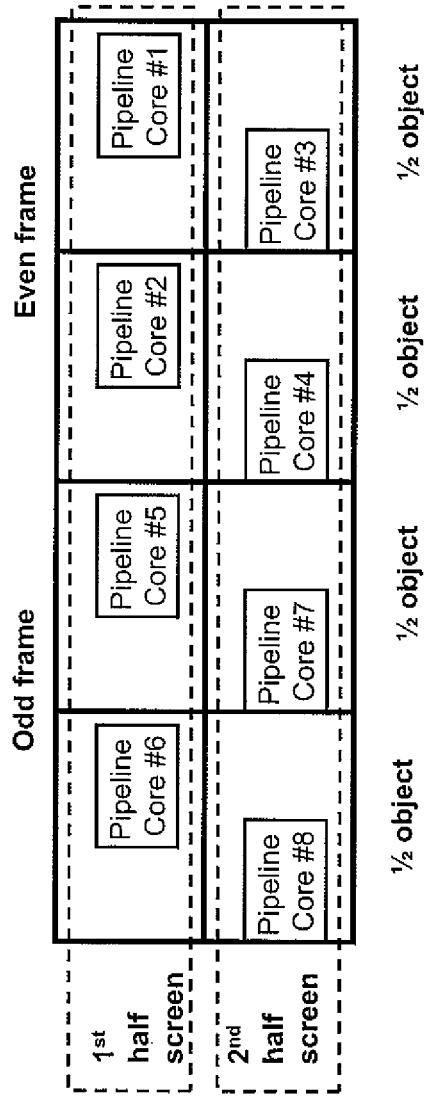

FIG. 5A4 is a block diagram of an illustrative embodiment of the Memory Controller Hub (MCH) chip technology of the present invention, wherein the MP-CL circuitry specified in FIG. 4F is integrated, for driving external GPU-based graphics cards, a single multiple-GPU graphics card, or a single-GPU graphics card;

FIG. 5B1 is a schematic representation of a high-performance graphics system of the present invention employing the GMCH chip technology of the present invention shown in FIGS. 5A1 or 5A2, wherein the MP-CL circuitry specified in FIG. 4F is integrated is integrated with its dual IDG processors, for driving a single display device;

FIG. 5B2 is a schematic representation of a graphics system of the present invention employing either the GMCH chip technology shown in FIG. 5A3 or the MCH chip technology shown in FIG. 5A4, wherein the MP-CL circuitry specified in FIG. 4F is integrated, for driving multiple single-GPU based graphics cards interfaced to multiple display devices;

FIG. 5B3 is a schematic representation of a graphics system of the present invention employing either the GMCH chip technology shown in FIG. 5A3 or the MCH chip technology shown in FIG. 5A4, wherein the MP-CL circuitry specified in FIG. 4F is integrated therein, for driving a multi-GPU based graphics card interfaced to a display device;

FIG. 5B4 is a schematic representation of a graphics system of the present invention employing either the GMCH chip technology shown in FIG. 5A3 or the MCH chip technology shown in FIG. 5A4, wherein MP-SOC Core Logic circuitry integrated therein is used to drive a single-GPU based graphics card interfaced to a display device;

FIG. 6 is the software block diagram for a computing system employing MP-SOC or MP-CL based technology according to the illustrative embodiment of the present invention;

FIG. 7A is a schematic block diagram further illustrating the modules that comprise the multi-pipe software drivers of the computing system illustrated in FIG. 6;

FIG. 7B is a flow chart illustrating the steps carried out by the mechanism that runs the three parallelization modes (i.e. Object Division, Image Division and Time Division) within the MP-SOC-based as well as MP-CL based devices and systems of the present invention;

FIG. 8 is a schematic representation illustrating the object-division configuration of the MP-SOC and/or MP-CL based system of the present invention;

FIG. 9 is a schematic representation illustrating the image-division configuration of the MP-SOC and/or MP-CL based system of the present invention;

FIG. 10 is a schematic representation illustrating the time-division configuration of the MP-SOC and/or MP-CL based system of the present invention;

FIG. 11 is a flowchart illustrating the process for distributing polygons between multiple GPU-driven pipeline cores along the MP-SOC-based and/or MP-CL based system of the present invention; and FIG. 12 shows an example of eight (8) GPU-driven pipeline cores arranged as a combination of parallel modes, in accordance with the principles of the present invention.

DETAILED DESCRIPTION OF THE PREFERRED EMBODIMENTS

The techniques taught in Applicant's prior PCT application No. PCT/IL04/001069, published as WIPO Publication No. WO 2005/050557 A2, incorporated herein by reference, teaches the use of a graphics scalable Hub architecture, comprised of Hardware Hub and Software Hub Driver, which serves to glue together (i.e. functioning in parallel) off-the-shelf GPU chips for the purpose of providing a high performance and scalable visualization solution, object division decomposition algorithm, employing multiple parallel modes and combination thereof, and adaptive parallel mode management. Also, PCT Application No. PCT/IL2004/000079, published as WIPO Publication No. WO 2004/070652 A2, incorporated herein by reference, teaches the use of compositing image mechanism based on associative decision making, to provide fast and non-expensive re-compositing of frame buffers as part of Object Division parallelism.

The approaches taught in Applicant's PCT Applications identified above have numerous advantages and benefits, namely the ability to construct powerful parallel systems by use of off-the-shelf GPUs, transparently to existing applications. However, in many applications, it will be desirable to provide such benefits in conventional graphics systems, using an alternative approach, namely: by providing PCs with a graphics processing and display architecture employing powerful graphics processing and display system realized on monolithic silicon chips, for the purpose of delivering high performance, high frame-rate stability of graphic solutions at relatively low-cost, and transparency to existing graphics applications.

The benefits of this novel alternative approach include VLSI-based miniaturization of multi-GPU clusters, high bandwidth of inter-GPU communication, lower power and heat dissipation, no redundancy of components, and low cost. Details on practicing this alternative approach will now be described below.

In general, the present invention disclosed herein teaches an improved way of and a means for parallelizing graphics functions on a semiconductor level, as a multiple graphic pipeline architecture realized on a single chip, preferably of monolithic construction. For convenience of expression, such a device is termed herein as a "multi-pipe system on chip" or "MP-SOC". This system "on a silicon chip" comprises a cluster of GPU-driven pipeline cores organized in flexible topology, allowing different parallelization schemes. Theoretically, the number of pipeline cores is unlimited, restricted only by silicon area considerations. The MP-SOC is driven by software driver modes, which re resident to the host CPU. The variety of parallelization schemes enables performance optimization. These schemes are time, image and object division, and derivatives of thereof.

The illustrative embodiment of the present invention enjoys the advantages of a multi GPU chip, namely: bypassing the converge limitation of a single GPU, while at the same time it gets rid of the inherent problems of a multi-GPU system, such as restricted bandwidth of inter-GPU communication, mechanical complexity (size, power, and heat), redundancy of components, and high cost.

As shown in FIG. 4A, the physical graphic system of the present embodiment comprises of a conventional motherboard (418) and MP-SOC based graphic card (415). The motherboard carries the usual set of components, which are CPU (411), system memory (412), Memory Bridge of I/O chipset (413), and other non-graphic components as well (see FIG. 1A for the complete set of components residing on a PC motherboard). The printed circuit graphic card based on the MP-SOC chip (416) connects to the motherboard via a PCI express 16x lanes connector (414). The card has also an output to at least one screen (416). The MP-SOC graphic card replaces the conventional single-GPU graphic card on the motherboard. The way the MP-SOC graphic card integrates in a conventional PC system becomes apparent from comparing FIG. 4A with FIG. 1A By simply replacing the single-GPU graphic card (circled in FIG. 1A) with the MP-SOC based card of the present invention, and replacing its drivers with multi-pipe soft drivers on the host CPU, the system of invention is realized with all of the advantages and benefits described herein. This modification is completely transparent to the user and application, apart from an improved performance.

FIG. 4B shows a possible physical implementation of the present invention. A standard form PC card (421) on which the MP-SOC (422) is mounted, connects to the motherboard (426) of the host computing system, via PCI express 16x lanes connector (423). The display screen is connected via standard DVI connector (424). Since the multiple pipelines on MP-SOC are anticipated to consume high power, for which the standard supply via PCI express connector is not adequate, an auxiliary power is supplied to the card via dedicated power cable (425). FIG. 4C shows the PCI express connector (431) on a motherboard to which a MP-SOC based card connects. It should be emphasized that the standard physical implementation of MP-SOC on a PC card makes it an easy and natural replacement of the prior art GPU-driven video graphics cards.

FIGS. 4D and 4E describe an artist's concept of the MP-SOC chip to further illustrate a physical implementation of the semiconductor device. FIG. 4D shows a possible MP-SOC silicon layout. In this example there are 4 off-the-shelf cores of graphic pipelines. The number of cores can be scaled to any number, pending silicon area restrictions. The detailed discussion on the MP-SOC functional units is given below. FIG. 4E shows possible packaging and appearance of the MP-SOC chip. As mentioned before, this chip, along with other peripheral components (e.g. memory chips, bus chips, etc.) intends to be mounted on a standard sized PCB (printed circuit board) and used as a sole graphic card in a PC system, replacing prior art video graphics cards. Production of MP-SOC based cards can be carried out by graphic card manufacturers (e.g. AsusTech, Gigabyte).

As presented in FIG. 4F, the multi-pipe-SOC architecture comprises the following components:

Routing center which is located on the CPU bus (e.g. PCI express of 16 lanes). It distributes the graphics data stream, coming from CPU among graphic pipeline cores, and then collects the rendered results (frame buffers) from cores, to the compositing unit. The way data is distributed is dictated by the control unit, depending on current parallelization mode.

Compositing unit re-composes the partial frame buffers according to the ongoing parallelization mode.

Control unit is under control of the CPU-resident soft multi-pipe driver. It is responsible for configuration and functioning of the entire MP-SOC system according to the parallelization mode.

Processing element (PE) unit with internal or external memory, and optional cache memory. The PE can be any kind of processor-on-chip according to architectural needs. Besides serving the PE, the cache and memory can be used to cache graphics data common to all pipeline cores, such as textures, vertex objects, etc.

Multiple GPU-driven pipeline cores. These cores may, but need not to be of proprietary designed. They can be originally designed as a regular single core GPU.

Profiling functions unit. This unit delivers to the multi-pipe driver a benchmarking data such as memory speed, memory usage in bytes, total pixels rendered, geometric data entering rendering, frame rate, workload of each pipeline core, load balance among pipeline cores, volumes of transferred data, textures count, and depth complexity.

Display interface, capable of running single or multiple screens.

As specified in FIG. 4F, the Multi-Pipeline Core Logic (MP-CL) circuitry of the present invention (460) comprises: the Routing Center 461, Compositing Unit 462, Control Unit 463, and Profiling Unit 464. This core plays central role in other embodiments of present invention, namely: integration of the MP-CL circuitry (460) of the present invention within the memory bridge component of the CPU chipsets. As described in FIGS. 5A1 through 5B4, there are various ways of integrating such technology into such CPU chipsets, but regardless of how the integration occurs, the goal will be typically the same, namely: to amplify all 3D graphic activities inside the chipset.

FIG. 5A1 shows a first illustrative embodiment of the Graphics and Memory Controller Hub (GMCH) chip of present invention in which all graphic components are duplicated and driven for parallelism by the MP-CL circuitry 460 of the present invention. As shown, the graphics subsystem comprises dual-IGD (Integrated Graphics Devices) in which the MP-CL circuitry (460) specified in FIG. 4F is integrated as shown. The command stream is delivered from processor to graphic engines via Routing Center 461. The data flows from system memory to Routing Center, as shown. The partial results are being composited according to parallelization method and sent to display.

Since the 2D and Video activities are much less demanding in compare to 3D, these two components are not necessarily duplicated, as shown in FIG. 5A2. In FIG. 5A2, a second illustrative embodiment of the Graphics and Memory Controller Hub (GMCH) chip of the present invention is shown comprising a graphics subsystem including a dual-3D-pipeline driven by the MP-CL circuitry of the present invention, and wherein the video and 2D engines are not duplicated. Rather, only the 3D pipeline is duplicated and parallelized. In either case, the external graphic card, which is not MP-CL circuitry driven, can be connected, switching out the IGD. A Scalable Graphics Hub (SGH) running multiple GPUs can replace the standard graphics card. SGH is another related invention described in Applicant's PCT/IL04/001069 which is incorporated herein by reference in its entirety.

The GMCH or MCH chip technology of the present invention can be used to parallelize multiple GPUs which are external thereto. This option is depicted in FIGS. 5A3 and 5A4.

FIG. 5A3 shows a third illustrative embodiment of the GMCH chip technology of the present invention as comprising a graphics subsystem having a single IGD with MP-CL circuitry (460) integrated therein as shown, for driving external GPU-based graphics cards. In this embodiment, the external GPUs are driven by MP-CL circuitry of the present invention, and such GPUs can be organized either as multiple graphics cards, or as multiple GPUs on single graphics card.

FIG. 5A4 shows an illustrative embodiment of the Memory Controller Hub (MCH) chip technology of the present invention as comprising MP-CL circuitry (460) integrated therein as shown for driving external GPU-based graphics cards, a single multiple-GPU graphics card, or a single-GPU graphics card. In this illustrative embodiment, only the routing center (461) is used for passing data to and from the external GPUs on a single or multiple graphics cards.

Notably, the GMCH or MCH chip technology of the present invention can be used as a general way of and means for driving all graphic cards, regardless of the vendor. Since the MP-CL circuitry of the present invention is generic in its very nature (i.e. the technology is capable of running/driving any off-the-shelf GPU), such innovative circuitry makes the GMCH or MCH chips of the present invention generic in terms of application, as well.

FIGS. 5B1 through 5B4 show different graphic systems utilizing the alternative ways of integrating the GMCH and MCH chip technology of the present invention.

FIG. 5B1 shows a high-performance graphics system of the present invention employing the GMCH chip technology of the present invention (523) shown in FIGS. 5A1 or 5A2, wherein the MP-CL circuitry specified in FIG. 4F is integrated is integrated with its dual IDG processors, for driving a single display device.

FIG. 5B2 shows a high-performance graphics system of the present invention employing either the GMCH chip technology (523') shown in FIG. 5A3 or the MCH chip technology (523") shown in FIG. 5A4, wherein the MP-CL circuitry specified in FIG. 4F is integrated, for driving multiple single-GPU based graphics cards interfaced to multiple display devices.

FIG. 5B3 shows another a high-performance graphics system of the present invention employing either the GMCH chip (523') technology shown in FIG. 5A3 or the MCH chip technology (523") shown in FIG. 5A4, wherein the MP-CL circuitry specified in FIG. 4F is integrated therein, for driving a multi-GPU based graphics card interfaced to a display device.

Finally, FIG. 5B4 shows yet another high-performance graphics system of the present invention employing either the GMCH chip technology (523') shown in FIG. 5A3 or the MCH chip technology (523") shown in FIG. 5A4, wherein MP-CL circuitry integrated therein is used to drive a single-GPU based graphics card interfaced to a display device.

Integration of MP-CL circuitry (460) into graphics chip designs according to the principles of the present invention results in a power graphics chip technology that is capable of driving virtually any graphic card, regardless of its vendor, with levels of photo-realistic performance that have been hitherto unattainable.

Having described the MP-SOC and MP-CL technology of the present invention, it is appropriate at this juncture to now describe (i) software components that would be typically used in conjunction therewith, and (ii) the operation of an overall computing system employing such technology, its various modes of parallelization. In connection therewith, it is noted that FIGS. 6 though 12 apply equally to computing systems employing either MP-SOC or MP-CL technology, or combinations thereof, in accordance with the principles of the present invention.

As shown in FIG. 6, the software of the system comprises the graphic application, graphics library (e.g. graphic standards OpenGL or DirectX), and proprietary soft driver (multi-pipe driver). The generic graphics application needs no modifications or special porting efforts to run on the MP-SOC of the present invention, as well as on computing systems employing MP-CL circuitry described in great detail above.

FIG. 7 shows a functional block diagram presenting the main tasks of the multi-pipe driver, according to an illustrative embodiment the present invention. The multi-pipe driver carries on at least the following actions/functions:

Generic GPU drivers. Perform all the functions of a generic GPU driver associated with interaction with the Operation System, graphic library (e.g. OpenGL or DirectX), and controlling the GPUs.

Distributed graphic functions control. This module performs all functions associated with carrying on the different parallelization modes according to parallelization policy management. In each mode, the data is differently distributed and re-composed among pipelines, as will be described in greater detail hereinafter.

State monitoring. The graphic libraries (e.g. OpenGL and DirectX) are state machines. Parallelization must preserve cohesive state across the graphic system. It is done by continuous analysis of all incoming commands, while the state commands and some of the data must be multiplicated to all pipelines in order to preserve the valid state across the graphic pipelines. A specific problem is posed by the class called Blocking operations such as Flush, Swap, Alpha blending, which affect the entire graphic system, setting the system to blocking mode. Blocking operations are exceptional in that they require a composed valid FB data, thus in the parallel setting of the present invention, they have an effect on all pipeline cores. A more detailed description of handling Blocking operations will be given hereinafter.

Application profiling and analysis module. This module performs real-time profiling and analysis of the running application. It continuously monitors of application parameters in the system, such as memory speed, memory usage in bytes, total pixels rendered, geometric data entering rendering, frame rate, workload of each pipeline core, load balance among graphic pipelines, volumes of transferred data, textures count, and depth complexity, etc. The profiler module identifies problem areas within the graphics system which cause bottlenecks. The profiler module requires inputs from the registers of the multi-pipe cores, registers of the MP-SOC control unit or MC-CL circuitry, and graphic API commands (e.g. OpenGL, DirectX).

Parallelism policy management makes a decision on the parallel mode to be performed, on a per-frame basis, based on the above profiling and analysis. The decision is then carried out by means of the control unit in the MP-SOC or MC-CL circuitry of the present invention.

A major feature of the present invention is its topological flexibility which enables revamping of performance bottlenecks. Such flexibility is gained by rearranging the cluster of graphics pipelines by means of routing center and different merging schemes at the compositing unit. Different parallelization schemes affect different performance bottlenecks. Therefore bottlenecks, identified by the profiling module, can be cured by utilizing the corresponding parallelization scheme.

The flowchart of FIG. 7B describes the mechanism that runs the three parallel modes: Object Division, Image Division and Time Division. The mechanism combines the activity of soft driver modules with MP-SOC and MP-CL units. The cycle of the flowchart is one frame. The mode to begin with is the Object Division (OD), since it is the preferred parallel mode, as it will be explained hereinafter. The profiling and analysis of the application is constantly on, under control of the soft Profile and Analysis module (S-PA). Every frame the Parallel Policy Management (S-PPM) module checks for the optimal mode, to choose from the three parallelization modes.

Let us assume that the Object Division (OD) path was taken. The Distributed Graphic Functions Control (S-DGFC) module configures the entire system for OD, characterized by distribution of geometric data and the compositing algorithm in use. This configuration is shown in FIG. 8, and described in detail later on. The S-DGFC module decomposes the geometric data into partitions, each sent by the Routing unit (C-RC) to different GPU-driven pipe core (C-PC) for rendering. The rendered stream of data is monitored by the State Monitoring (S-SM) module for blocking commands, as shown in FIG. 11, and described in great detail hereinafter. When the rendering is completed, all the Frame Buffers are moved by the Control Unit (C-Ctrl) to Compositing Unit (C-CU) to composite all buffers to a single one, based on depth test (as explained in detail below). The final FB is moved to Display by Display Interface Unit (C-DI). At the end of the frame the S-PA and S-PPM modules test for the option of changing the parallel mode. If decision was taken to stay with the same mode, a new OD frame starts with another data partition. Otherwise, a new test for optimal mode is performed by S-PA and S-PPM modules.

The left path in the flowchart is Image Division (ID) operation. The ID configuration, as set by the S-DGFC, is also shown in FIG. 9, and described later in greater detail. It is characterized by broadcasting of the same data among all pipe cores, and by image based compositing algorithm. The partitioning of image among pipe cores is done by S-DGFC. The data is broadcast by the Routing Center, and then rendered at pipe cores (C-PC), while each one is designated another portion of image. Upon accomplishing of rendering, the C-Ctrl moves the partial FBs to compositing unit (C-CU) for reconstruction of the complete image. Then C-DI moves the FB to Display. Finally the Change test is performed by S-PS and S-PPM modules. Pending the result, a new frame will continue the ID mode, or switch to another mode.

The Time Division mode alternates frames among the GPU-driven pipe cores. It is set for alternation by the S-GDFC module, while each core is designated a frame data by S-DGFC and delivered by the C-RC unit. Each core (C-PC) generates a frame, in a line. Then the C-Ctrl moves the matured FB via compositing unit to the Display Interface, and out to the display. Actually, the compositing unit in this mode acts just as a transit. Finally there is a change-mode test by S-PA and S-PPM modules, the same as in the other modes before.

FIG. 8 describes the object-division parallelization scheme. The soft driver, and specifically the Distributed Graphic Functions Control module, breaks down the polygon data of a scene into N partial streams (N—the number of participating pipeline cores). The entire data is sent, by the GPU Drivers module, to the MP-SOC Routing Center, which distributes the data to N pipeline cores for rendering, according to the soft driver's partition, each of approximately 1/N polygons. Rendering in the pipeline cores is done under the monitoring of State Monitoring module of the soft driver (FIG. 11 and detailed description below). The resultant full frame buffers are gathered in the Compositing Unit. They are depth-composed, pixel by pixel to find the final set of visible pixels. At each x-y coordinate all hidden pixels are eliminated by compositing mechanism. The final frame buffer is moved out to display.

FIG. 9 describes the image-division parallelization scheme, which is chosen by Parallelism Policy Management module, as a result of profiling, analysis, and decision making in the Profiling and Analysis module of the soft driver. Each pipeline core is designated a unique 1/N part of the screen. The complete polygon data is delivered to each of the pipeline cores via the GPU Driver module and Routing Center. The parallel rendering in pipeline cores results in partial frame buffer at each. The image segments are moved to the Compositing Unit for 2D merging into a single image and moved out to the display.

FIG. 10 describes the time-division parallelization scheme which is chosen by Parallelism Policy Management module, as a result of profiling, analysis, and decision making in the Profiling and Analysis module of the soft driver. The Distributed Graphic Functions Control module, through GPU Drivers module, divides the frames into N cycles (N=number of cores) letting each core time slot of N frames for rendering the entire polygon data. Therefore the scene polygon data is distributed, via Router, to a different pipeline core at a time Each core performs rendering during N cycles, and outputs its full frame buffer to display, for a single frame. The Compositing unit functions here as a simple switch, alternating the access to the Display among all the pipeline cores.

Different parallelization schemes resolve different performance bottlenecks. Therefore bottlenecks must be identified and then eliminated (or reduced) by applying the right scheme at the right time.

As shown in FIG. 7B, the profiler identifies problem areas within the graphics system which cause bottlenecks. It is implemented in the Application Profiling and Analysis module of the driver. The profiler module requires such inputs as usage of graphic API commands (e.g. OpenGL, DirectX, other), memory speed, memory usage in bytes, total pixels rendered, geometric data entering rendering, frame rate, workload of each GPU, load balance among GPUs, volumes of transferred data, textures count, and depth complexity, etc. These data types are collected from the following sources within the MP-SOC as well as MP-CL based graphics systems:

1. The profiling functions unit in MP-SOC as well as MP-CL circuitry
2. The driver
3. The pipeline cores
4. Chipset Architecture Performance (CHAP) Counters Typically, the performance data is retrieved on a frame time basis, however, the periodicity can also be a configuration attribute of the profiler, or can be set based on a detected configuration event which the profiler is designed to detect before retrieving performance data.

The analysis, resulting in the selection of a preferred parallel method is based on the assumption that in a well defined case (described below), object-division method supersedes the other division modes in that it reduces more bottlenecks. In contrast to image-division, that reduces only the fragment/fill bound processing at each pipeline core, the object-division relaxes virtually all bottleneck across the pipeline: (i) the geometry (i.e. polygons, lines, dots, etc) transform processing is offloaded at each pipeline, handling only 1/N of polygons (N—number of participating pipeline cores); (ii) fill bound processing is reduced since less polygons are feeding the rasterizer, (iii) less geometry memory is needed; (iv) less texture memory is needed.

Although the time-division method releases bottlenecks by allowing to each pipeline core more time per frame generation, however this method suffers from severe problems such as CPU bottlenecks, the pipeline cores generated frame buffers that are not available to each other, and there are frequent cases of pipeline latency. Therefore this method is not suitable to all applications. Consequently, due to its superiority as bottleneck opener, object-division becomes the primary parallel mode.

The following object division algorithm distributes polygons among the multiple graphic pipeline cores. Typical application generates a stream of graphic calls that includes blocks of graphic data; each block consists of a list of geometric operations, such as single vertex operations or buffer based operations (vertex array). Typically, the decomposition algorithm splits the data between pipeline cores preserving the blocks as basic data units. Geometric operations are attached to the block(s) of data, instructing the way the data is handled. A block is directed to designated GPU. However, there are operations belonging to the group of Blocking Operations, such as Flush, Swap, Alpha blending, which affect the entire graphic system, setting the system to blocking mode. Blocking operations are exceptional in that they require a composed valid FB data, thus in the parallel setting of the present invention, they have an effect on all pipeline cores. Therefore, whenever one of the Blocking operations is issued, all the pipeline cores must be synchronized. Each frame has at least 2 blocking operations: Flush and Swap, which terminate the frame.

FIG. 11 presents a flowchart describing an algorithm for distributing polygons among multiple GPU-driven pipeline cores, according to an illustrative embodiment of the present invention. The frame activity starts with distributing blocks of data among GPUs. Each graphic operation is tested for blocking mode at step 1112. In a regular path (non-blocking path), data is redirected to the designated pipeline core at step 1113. This loop is repeated until a blocking operation is detected.

When the blocking operation is detected, all pipeline cores must be synchronized at step 1114 by at least the following sequence:
- performing a flush operation in order to terminate rendering and clean up the internal pipeline (flushing) in pipeline core;
- performing a composition in order to merge the contents of all FBs into a single FB; and
- transmitting the contents of said single FB back to all pipeline cores, in order to create a common ground for continuation.

The Swap operation activates the double buffering mechanism, swapping the back and front color buffers. If Swap is detected at step 1115, it means that the composited frame must be terminated at all pipeline cores, except pipeline0. All pipeline cores have the final composed contents of a FB designated to store said contents, but only the one connected to the screen (pipeline0) displays the image at step 1116.

Another case is operations that are applied globally to the scene and need to be broadcasted to all the pipeline cores. If one of the other blocking operations is identified, such as Alpha blending for transparency, then all pipeline cores are flushed as before at step 1114, and merged into a common FB. This time the Swap operation is not detected (step 1115), therefore all pipeline cores have the same data, and as long as the blocking mode is on (step 1117), all of them keep processing the same data (step 1118). If the end of the block mode is detected at step 1117, pipeline cores return working on designated data (step 1113).

The relative advantage of object-division depends very much on depth complexity of the scene. Depth complexity is the number of fragment replacements as a result of depth tests (the number of polygons drawn on every pixel). In the ideal case of no fragment replacement (e.g. all polygons of the scene are located on the same depth level), the fill is reduced according to the reduced number of polygons (as for 2 pipeline cores). However, when depth complexity is getting high, the advantage of object-division drops down, and in some cases the image-division may even perform better, e.g. applications with small number of polygons and high volume of textures.

In addition, the present invention introduces a dynamic load-balancing technique that combines the object division method with the image division and time division methods in image and time domains, based on the load exhibits by previous processing stages. Combining all the three parallel methods into a unified framework dramatically increases the frame rate stability of the graphic system.

FIG. 12 discloses a sample configuration of the system, employing 8 pipeline cores, according to an embodiment of the present invention. According to the above sample configuration, a balanced graphic application is assumed. The pipeline cores are divided into two groups for time division parallelism. Pipeline cores indexed with 1, 2, 3, and 4 are configured to process even frames and pipeline cores indexed with 5, 6, 7, and 8 are configured to process odd frames. Within each group, two pipeline core subgroups are set for image division: the pipeline cores with the lower indexes (1,2 and 5,6 respectively) are configured to process half of the screen, and the high-indexed pipeline cores (3,4 and 7,8 respectively) are configured to process the other half. Finally, for the object division, pipeline cores indexed with 1, 3, 5 and 7 are fed with half of the objects, and pipeline cores indexed with 2, 4, 6 and 8 are fed with the other half of the objects.

If at some point the system detects that the bottlenecks exhibited in previous frames occur at the raster stage of the pipeline, it means that fragment processing dominates the time it takes to render the frames and that the configuration is imbalanced. At that point the pipeline cores are reconfigured, so that each pipeline core will render a quarter of the screen within the respective frame. The original partition for time division, between pipeline cores 1,2,3,4 and between 5,6,7,8 still holds, but pipeline core 2 and pipeline core 5 are configured to render the first quarter of screen in even and odd frames respectively. Pipeline cores 1 and 6—render the second quarter, pipeline cores 4 and 7—the third quarter, and pipeline cores 3 and 8—the forth quarter. No object division is implied.

In addition, if at some point the system detects that the bottleneck exhibited in previous frames occurs at the geometry stage of the pipe, the pipeline cores are reconfigured, so that each pipeline core will process a quarter of the geometrical data within the respective frame. That is, pipeline cores 3 and 5 are configured to process the first quarter of the polygons in even and odd frames respectively. Pipeline cores 1 and 7—render the second quarter, pipeline cores 4 and 6—the third quarter and pipeline cores 2 and 8—the forth quarter. No image division is implied.

It should be noted, that taking 8 pipeline cores is sufficient in order to combine all three parallel modes, which are time, image and object division modes, per frame. Taking the number of pipeline cores larger than 8, also enables combining all 3 modes, but in a non-symmetric fashion. The flexibility also exists in frame count in a time division cycle. In the above example, the cluster of 8 pipeline cores was broken down into the two groups, each group handling a frame. However, it is possible to extend the number of frames in a time division mode to a sequence, which is longer than 2 frames, for example 3 or 4 frames.

Taking a smaller number of pipeline cores still allows the combination of the parallel modes, however the combination of two modes only. For example, taking only 4 pipeline cores enables to combine image and object division modes, without time division mode. It is clearly understood from FIG. 12, while taking the group of pipeline cores 1-4, which is the left cluster. Similarly, the group of pipeline cores 1,2,5, and 6 which consist the upper cluster, employs both object and time division modes. Finally, the configuration of the group of pipeline cores 2,4,5, and 6, which is the middle cluster, employs image and time division modes.

It should be noted, that similarly to the above embodiments, any combination between the parallel modes can be scheduled to evenly balance the graphic load.

It also should be noted, that according to the present invention, the parallelization process between all pipeline cores may be based on an object division mode or image division mode or time division mode or any combination thereof in order to optimize the processing performance of each frame.

The decision on parallel mode is done on a per-frame basis, based on the above profiling and analysis. It is then carried out by reconfiguration of the parallelization scheme, as described above and shown in FIGS. 8, 9, 10 and 12.

The MP-SOC and MP-CL technology architecture of the present invention described in great detail hereinabove can be readily adapted for use in diverse kinds of graphics processing and display systems. While the illustrative embodiments of the present invention have been described in connection with PC-type computing systems, it is understood that the present invention can be use improve graphical performance in diverse kinds of systems including mobile computing devices, embedded systems, and as well as scientific and industrial computing systems supporting graphic visualization of photo-realistic quality.

It is understood that the graphics processing and display technology described in the illustrative embodiments of the present invention may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A multi-GPU based graphics processing and display system for use within a computing system including an image display device having a display surface, said multi-GPU based graphics processing and display system comprising:
    multiple graphics processing unit (GPU) driven pipeline cores wherein each said GPU-driven pipeline core includes a GPU and generates pixel values of images from 3D graphics primitives, associated with at least a portion of a digital image to be displayed on said display surface;
    a routing center for distributing graphics data received from a CPU to said multiple GPU driven pipeline cores and for collecting rendering results from said multiple GPU driven pipeline cores,
    a processing element (PE) capable of processing graphics data used by said multiple GPU-driven pipeline cores;
    a cache memory for serving said processing element, and for caching graphics data; and
    a display interface for receiving said rendering results from said routing center and for interfacing with said image display device, so that said generated pixel values of images can be displayed on the display surface of said image display device;
    wherein said multiple graphics processing unit (GPU) driven pipeline cores, routing center, said processing element, said cache memory, and said display interface are implemented on a single semiconductor chip, and
    wherein said multiple GPU driven pipeline cores are arranged in parallel on said single semiconductor chip to receive graphics data from said routing center according to a parallelization mode.

2. The system of claim 1, wherein each GPU-driven pipeline core receives 3D graphics primitives as input, and generates pixel based images as output.

3. The system of claim 2, wherein said 3D graphics primitives include polygons.

4. The system of claim 1, wherein said router is connected to a system bus.

5. The system of claim 1, wherein said processing element comprises a processor serving the architectural needs of the system.

6. The system of claim 1, wherein said multiple GPU-driven pipeline cores comprises at least four GPU-driven pipeline cores.

7. The system of claim 1, wherein said cache can be used to cache graphics data common to all said GPU-driven pipeline cores.

8. The system of claim 1, wherein said cache can be used to cache textures and vertex objects.

9. The system of claim 1, wherein said display interface is capable of running single or multiple screens.

10. The system of claim 1, wherein each GPU-driven pipeline core comprises a geometry subsystem for processing 3D graphics primitives, and a pixel subsystem for computing pixel values, functionally coupled to each other.

11. The system of claim 1 wherein said single semiconductor chip is of monolithic construction.

12. The system of claim 1 wherein said single semiconductor chip is a silicon chip.

* * * * *